(12) United States Patent
Li et al.

(10) Patent No.: US 11,665,119 B2
(45) Date of Patent: May 30, 2023

(54) INFORMATION REPLYING METHOD, APPARATUS, ELECTRONIC DEVICE, COMPUTER STORAGE MEDIUM, AND PRODUCT

(71) Applicant: BEIJING BYTEDANCE NETWORK TECHNOLOGY CO., LTD., Beijing (CN)

(72) Inventors: Xinyi Li, Beijing (CN); Na Sun, Beijing (CN); Siqi Tan, Beijing (CN); Ye Lin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/689,075

(22) Filed: Mar. 8, 2022

(65) Prior Publication Data

US 2023/0006952 A1 Jan. 5, 2023

(30) Foreign Application Priority Data

Jul. 1, 2021 (CN) .......................... 202110746234.0

(51) Int. Cl.
*H04L 51/18* (2022.01)
*G06F 3/0484* (2022.01)
*H04L 51/10* (2022.01)
*H04L 51/224* (2022.01)

(52) U.S. Cl.
CPC ............ *H04L 51/18* (2013.01); *G06F 3/0484* (2013.01); *H04L 51/10* (2013.01); *H04L 51/224* (2022.05)

(58) Field of Classification Search
CPC ....... H04L 51/18; H04L 51/224; H04L 51/10; G06F 3/0484
See application file for complete search history.

(56) References Cited

U.S. PATENT DOCUMENTS

| | | | |
|---|---|---|---|
| 7,130,525 B1 * | 10/2006 | Iwano | G11B 27/11 |
| 7,246,127 B2 * | 7/2007 | Murakami | H04N 9/8042 |
| | | | 707/999.102 |
| 7,290,213 B2 * | 10/2007 | Kake | G06F 16/9535 |
| | | | 715/848 |
| 7,730,030 B1 * | 6/2010 | Xu | G06Q 10/10 |
| | | | 707/758 |
| 9,743,010 B1 * | 8/2017 | Edwards | H04N 23/745 |
| 9,774,926 B1 * | 9/2017 | Greenfield | H04N 21/44222 |
| 10,042,862 B2 * | 8/2018 | Gorman | G06F 16/29 |
| 10,496,267 B2 * | 12/2019 | Luo | G06F 3/04817 |

(Continued)

FOREIGN PATENT DOCUMENTS

| | | |
|---|---|---|
| CN | 109525896 A | 3/2019 |
| CN | 111937000 A | 11/2020 |
| CN | 112698769 A | 4/2021 |

*Primary Examiner* — Ninos Donabed

(57) ABSTRACT

This disclosure relates to an information replying method, apparatus, electronic device, computer storage medium, and product. The method includes: after favoriting target information, displaying the target information in a favorites page in response to a viewing instruction with respect to the target information, the target information being obtained by commenting on or replying to target multimedia content; receiving a reply instruction with respect to the target information; and replying to the target information in response to the reply instruction.

10 Claims, 15 Drawing Sheets

(56) References Cited

U.S. PATENT DOCUMENTS

| | | | | |
|---|---|---|---|---|
| 2004/0003352 | A1* | 1/2004 | Bargeron | G06F 16/9535 715/255 |
| 2006/0242234 | A1* | 10/2006 | Counts | H04W 4/08 709/204 |
| 2007/0136693 | A1* | 6/2007 | Lilleness | H04N 21/41265 345/169 |
| 2009/0182775 | A1* | 7/2009 | Yoshimoto | H04N 5/77 |
| 2010/0070579 | A1* | 3/2010 | Olson | G06Q 10/10 709/205 |
| 2011/0264737 | A1* | 10/2011 | Skinner | G06Q 10/10 709/204 |
| 2012/0110616 | A1* | 5/2012 | Kilar | H04N 7/163 725/32 |
| 2012/0210217 | A1* | 8/2012 | Abbas | G11B 27/031 715/716 |
| 2013/0018948 | A1* | 1/2013 | Douillet | G06F 9/541 709/204 |
| 2013/0254308 | A1* | 9/2013 | Rose | H04N 21/4882 709/206 |
| 2014/0020024 | A1* | 1/2014 | Asam | H04N 21/482 725/41 |
| 2014/0046778 | A1* | 2/2014 | Olson | G06Q 30/0277 705/14.69 |
| 2014/0180798 | A1* | 6/2014 | Bailey | G06Q 30/0277 705/14.45 |
| 2014/0320425 | A1* | 10/2014 | Jeong | G06F 3/04886 345/173 |
| 2016/0171003 | A1* | 6/2016 | Ju | H04L 65/4015 715/721 |
| 2016/0259497 | A1* | 9/2016 | Foss | G06F 3/0481 |
| 2016/0371064 | A1* | 12/2016 | Rougerie | G01S 19/25 |
| 2017/0199046 | A1 | 7/2017 | Lee et al. | |
| 2017/0372324 | A1 | 12/2017 | Frosst | |
| 2018/0012237 | A1* | 1/2018 | Krasikov | G06Q 50/01 |
| 2018/0232792 | A1* | 8/2018 | Williams | G06Q 20/20 |
| 2018/0246983 | A1* | 8/2018 | Rathod | G06F 16/9566 |
| 2018/0285818 | A1* | 10/2018 | Soltani | G06Q 50/01 |
| 2019/0012531 | A1* | 1/2019 | Radwin | G06T 7/251 |
| 2019/0392866 | A1* | 12/2019 | Yoon | G11B 27/28 |
| 2020/0027172 | A1 | 1/2020 | Benfield et al. | |
| 2020/0251073 | A1* | 8/2020 | Kano | G06F 16/637 |
| 2020/0257723 | A1* | 8/2020 | Kano | G06F 16/64 |
| 2021/0142000 | A1 | 5/2021 | Vis et al. | |

* cited by examiner

INFORMATION REPLYING METHOD, APPARATUS, ELECTRONIC DEVICE, COMPUTER STORAGE MEDIUM, AND PRODUCT

CROSS-REFERENCE TO RELATED APPLICATIONS

The present disclosure is based on and claims priority to China Patent Application No. 202110746234.0 filed on Jul. 1, 2021, the disclosure of which is incorporated by reference herein in its entirety.

TECHNICAL FIELD

The present disclosure relates to the field of Internet technologies, and in particular, to an information replying method, apparatus, electronic device, computer storage medium, and product.

BACKGROUND

With the continuous development of Internet technologies, when viewing, by using a client, information of commenting on or replying to multimedia content, such as a comment, a question, or the like, a user often wants to reply to the information. At present, the user could reply to the information only after the information has been displayed in a comment area of a playing interface of the multimedia content.

However, a single and inflexible reply manner in the prior art affects the user's interest in the reply.

SUMMARY

To solve the above technical problem, or at least partially solve the above technical problem, the present disclosure provides an information replying method, apparatus, electronic device, computer storage medium, and product.

In a first aspect, the present disclosure provides an information replying method, comprising:

after favoriting target information, displaying the target information in a favorites page in response to a viewing instruction with respect to the target information, the target information being obtained by commenting on or replying to target multimedia content;

receiving a reply instruction with respect to the target information; and replying to the target information in response to the reply instruction.

According to the method provided in the first aspect, after the target information being favorited, a client may display the target information in the favorites page in response to the viewing instruction with respect to the target information. After the reply instruction with respect to the target information being received, the client may reply to the target information. Therefore, with the help of the favorited information, replying to the information again may be enabled, which reduces complexity of user operation, helps to enrich channels for providing replies, enhances the user's interest in replying to the information, and improves the probability of creating and publishing a video by the user.

In a possible design, the receiving a reply instruction with respect to the target information comprises:

receiving the reply instruction corresponding to a trigger operation performed on a first control displayed in the favorites page, wherein the first control is used for replying to the target information in a text form and/or a multimedia form.

In a possible design, the receiving a reply instruction with respect to the target information comprises:

receiving the reply instruction corresponding to a trigger operation performed on a second control displayed in the favorites page, wherein the second control is used for replying to the target information in a multimedia form.

In a possible design, the receiving a reply instruction with respect to the target information comprises:

after receiving an instruction corresponding to a trigger operation having a duration greater than or equal to a preset duration performed on the target information, displaying a third control in the favorites page; and receiving the reply instruction corresponding to a trigger operation performed on the third control.

In a possible design, the method further comprises:

after receiving the instruction corresponding to the trigger operation having the duration greater than or equal to the preset duration performed on the target information, displaying a fourth control in the favorites page; and receiving an instruction corresponding to a trigger operation performed on the fourth control, to perform any of operations of cancelling the favoriting, copy, and translation on the target information.

In a possible design, the method further comprises:

after receiving an instruction corresponding to a trigger operation having a duration less than the preset duration performed on the target information, jumping to a playing interface of the target multimedia content, and displaying the target information in a comment area of the playing interface of the target multimedia content, wherein the comment area of the playing interface of the target multimedia content is an area for commenting on or replying to the target multimedia content.

In a possible design, the replying to the target information in response to the reply instruction comprises:

acquiring first multimedia content, the first multimedia content being content with which the target information is replied to, wherein a first sticker containing the target information is displayed on a playing interface of the first multimedia content.

In a possible design, the method further comprises:

sending the first multimedia content to a server so that the server sends a notification message to a client associated with the target information, wherein the notification message is used for notifying the client associated with the target information that the target information has been replied to in a multimedia form.

In a possible design, the method further comprises:

displaying the target information and a first card in a comment area of a playing interface of the target multimedia content, wherein the comment area of the playing interface of the target multimedia content is an area for commenting on or replying to the target multimedia content, and the first card comprises a thumbnail jointly formed by a playing picture of the first multimedia content and the first sticker.

In a possible design, the method further comprises:

displaying the target information in a comment area of a playing interface of the target multimedia content, the comment area of the playing interface of the target multimedia content being an area for commenting on or replying to the target multimedia content;

after receiving an instruction corresponding to a trigger operation performed on the target information, displaying a fifth control on the comment area of the playing interface of the target multimedia content; and after receiving an instruction corresponding to the trigger operation performed on the fifth control, favoriting the target information.

In a possible design, the method further comprises:

playing second multimedia content and displaying a second sticker containing the target information on a playing interface of the second multimedia content, the second multimedia content being content with which the target information is replied to; and after receiving an instruction corresponding to a trigger operation performed on the second sticker, favoriting the target information.

In a possible design, the method further comprises:

after receiving an instruction corresponding to the trigger operation performed on the second sticker, jumping to a playing interface of the target multimedia content, and displaying the target information and a second card in a comment area of the playing interface of the target multimedia content, wherein the second card comprises a thumbnail jointly formed by a playing picture of the second multimedia content and the second sticker.

In a second aspect, the present disclosure provides an information replying apparatus, comprising:

a display module for displaying, after target information being favorited, the target information in a favorites page in response to a viewing instruction with respect to the target information, the target information being obtained by commenting on or replying to target multimedia content;

a receiving module for receiving a reply instruction with respect to the target information; and a reply module for replying to the target information in response to the reply instruction.

In a possible design, the receiving module is specifically for receiving the reply instruction corresponding to a trigger operation performed on a first control displayed in the favorites page, wherein the first control is used for replying to the target information in a text form and/or a multimedia form.

In a possible design, the receiving module is specifically for receiving the reply instruction corresponding to a trigger operation performed on a second control displayed in the favorites page, wherein the second control is used for replying to the target information in a multimedia form.

In a possible design, the receiving module is specifically for displaying a third control in the favorites page after receiving an instruction corresponding to a trigger operation having a duration greater than or equal to a preset duration performed on the target information; and receive the reply instruction corresponding to a trigger operation performed on the third control.

In a possible design, the receiving module is further for displaying a fourth control in the favorites page after receiving the instruction corresponding to the trigger operation having the duration greater than or equal to the preset duration performed on the target information; and receiving an instruction corresponding to a trigger operation performed on the fourth control, to perform any of operations of cancelling the favoriting, copy, and translation on the target information.

In a possible design, the receiving module is further for jumping to a playing interface of the target multimedia content after receiving an instruction corresponding to a trigger operation having a duration less than the preset duration performed on the target information, and displaying the target information in a comment area of the playing interface of the target multimedia content, wherein the comment area of the playing interface of the target multimedia content is an area for commenting on or replying to the target multimedia content.

In a possible design, the reply module is specifically for acquiring first multimedia content, the first multimedia content being content with which the target information is replied to, wherein a first sticker containing the target information is displayed on a playing interface of the first multimedia content.

In a possible design, the apparatus further comprises:

a sending module for sending the first multimedia content to a server so that the server sends a notification message to a client associated with the target information, wherein the notification message is used for notifying the client associated with the target information that the target information has been replied to in a multimedia form.

In a possible design, the display module is further for displaying the target information and a first card in a comment area of a playing interface of the target multimedia content, wherein the comment area of the playing interface of the target multimedia content is an area for commenting on or replying to the target multimedia content, and the first card comprises a thumbnail jointly formed by a playing picture of the first multimedia content and the first sticker.

In a possible design, the apparatus further comprises:

the display module further for displaying the target information in a comment area of a playing interface of the target multimedia content, the comment area of the playing interface of the target multimedia content being an area for commenting on or replying to the target multimedia content;

the display module further for displaying a fifth control on the comment area of the playing interface of the target multimedia content after receiving an instruction corresponding to a trigger operation performed on the target information; and a favoriting module for favoriting the target information after receiving an instruction corresponding to the trigger operation performed on the fifth control.

In a possible design, the display module is further for playing second multimedia content and displaying a second sticker containing the target information on a playing interface of the second multimedia content, the second multimedia content being content with which the target information is replied to; and the favoriting module is further for favoriting the target information after receiving an instruction corresponding to a trigger operation performed on the second sticker.

In a possible design, the display module is further for jumping to a playing interface of the target multimedia content after receiving an instruction corresponding to the trigger operation performed on the second sticker, and displaying the target information and a second card in a comment area of the playing interface of the target multimedia content, wherein the second card comprises a thumbnail jointly formed by a playing picture of the second multimedia content and the second sticker.

For beneficial effects of the information replying apparatus provided in the above second aspect and each of possible designs of the above second aspect, reference may be made to the beneficial effects brought in the above first aspect and each of possible implementations of the first aspect, which are not repeated herein.

In a third aspect, the present disclosure provides an electronic device, comprising: a memory and a processor, wherein the memory is for storing program instructions, and the processor is for calling the program instructions in the memory to cause the electronic device to perform the information replying method in the first aspect and any of the possible designs of the first aspect.

In a fourth aspect, the present disclosure provides a non-transitory computer storage medium comprising computer instructions which, when being run on an electronic device, cause the electronic device to perform the information replying method in the first aspect and any of the possible designs of the first aspect.

In a fifth aspect, the present disclosure provides a computer program product storing thereon computer instructions which, when being run on a computer, cause the computer to perform the information replying method of the first aspect and any of the possible designs of the first aspect.

In a sixth aspect, the present disclosure provides a chip system applied to an electronic device comprising a display, a memory, and a sensor, wherein the chip system comprises: a processor which, when executing computer instructions stored in the memory, causes the electronic device to perform the information replying method of the first aspect and any of the possible designs of the first aspect.

BRIEF DESCRIPTION OF THE DRAWINGS

The accompanying drawings herein, which are incorporated into and constitute a part of this specification, illustrate embodiments consistent with the present disclosure and, together with the description, serve to explain the principles of the present disclosure.

In order to more clearly illustrate the embodiments of the present disclosure or technical solutions in the prior art, the drawings used in the description of the embodiments or technical solutions in the prior art will be briefly described below, and it is obvious for those of ordinary skill in the art that other drawings may also be obtained according to these drawings without paying out creative efforts.

DETAILED DESCRIPTION

Figure 1A:
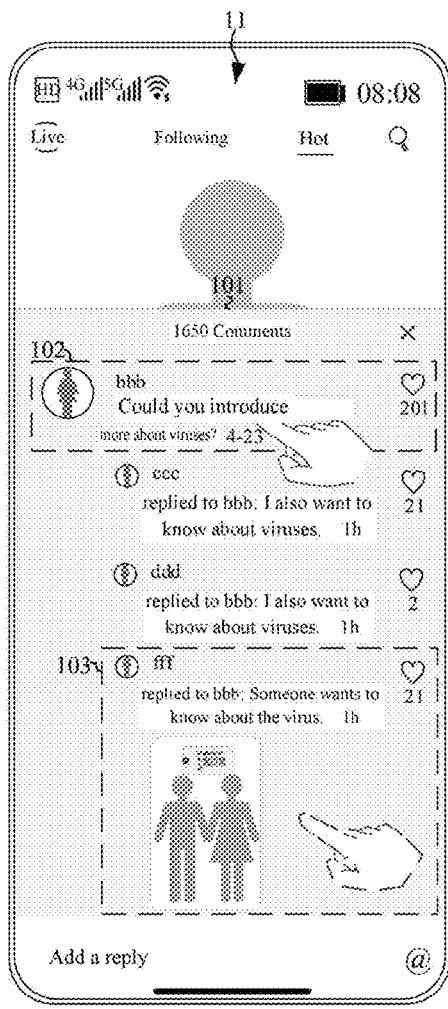
FIGS. 1A to 1Y are schematic diagrams of human-computer interaction interfaces according to embodiments of the present disclosure.

In order to more clearly understand the above objectives, features and advantages of the present disclosure, solutions of the present disclosure will be further described below. It should be noted that, in the case of no conflict, embodiments of the present disclosure and features in the embodiments may be combined with each other.

In the following description, numerous specific details are set forth in order to facilitate a thorough understanding of the present disclosure, but the present disclosure may be implemented in other ways different from those described herein; and it is obvious that the embodiments in the specification are only some of the embodiments of the present disclosure, and not all of them.

Exemplarily, according to the information replying method, apparatus, electronic device, computer storage medium, and computer program product, provided in the present disclosure, after target information being favorited, the target information may be displayed in a favorites page, and an entry to replying to the target information is added in the favorites page, so that the reply to the target information is conveniently implemented without searching for and replying to the target information in a comment area of a playing interface of target multimedia content, which reduces complexity of user operation, helps to enrich channels for providing replies, and enhances the user's interest in replying to the target information.

The target information is obtained by commenting on or replying to the target multimedia content. In the present disclosure, specific implementations of the target information are not limited. In some embodiments, the target information may include: comment information and/or question information of the target multimedia content.

A form of replying to the target information, which is mentioned in the present disclosure, may include: a text form and a multimedia content form. The text form may be understood as replying to the target information by using for example text, symbol, number, letter, picture, moving picture, etc. The multimedia content form may be understood as replying to the target information by using multimedia content, or by using multimedia content and reply text. The reply text may be in a form of for example text, symbol, number, letter, etc.

A client may implement the information replying method of the present disclosure through an electronic device, or an application (APP), a web page, etc. in the electronic device. The electronic device may include a mobile phone, a tablet computer, a wearable electronic device, a vehicle-mounted device, an augmented reality (AR)/virtual reality (VR) device, a notebook computer, an ultra-mobile personal computer (UMPC), a netbook, a personal digital assistant (PDA), a smart home device such as a smart television, a smart screen, a high-definition television, a 4K television, a smart speaker, a smart projector, etc., and a specific type of the electronic device is not limited in the present disclosure.

In the present disclosure, a type of an operating system of the electronic device is not limited, and may be for example, an Android system, a Linux system, a Windows system, an iOS system, etc.

Based on the foregoing description and in conjunction with FIG. 1A to FIG. 1Y, by taking an example that the electronic device is a mobile phone, a client installed in the mobile phone is a video APP (application 1 for short), and target information is a comment 1, a specific implementation process of the information replying method provided in the present disclosure will be described in detail.

Figure 1B:
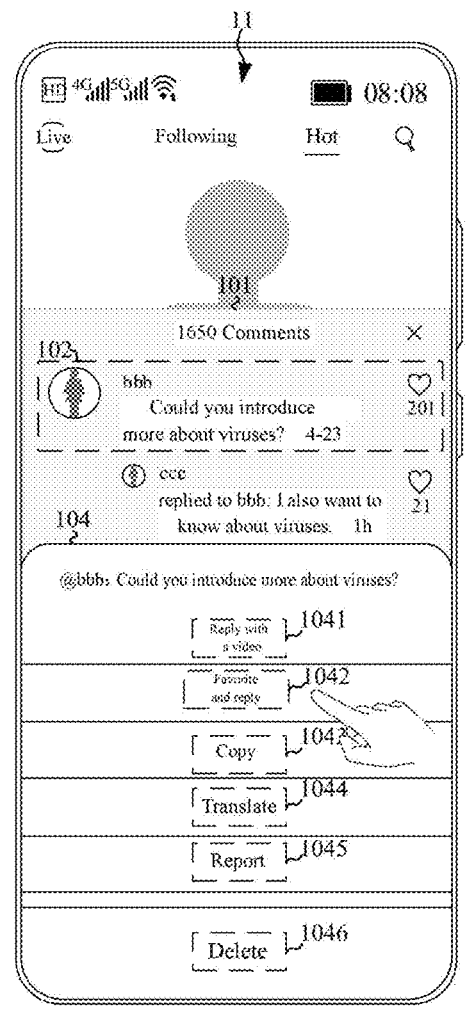
Figure 1C:
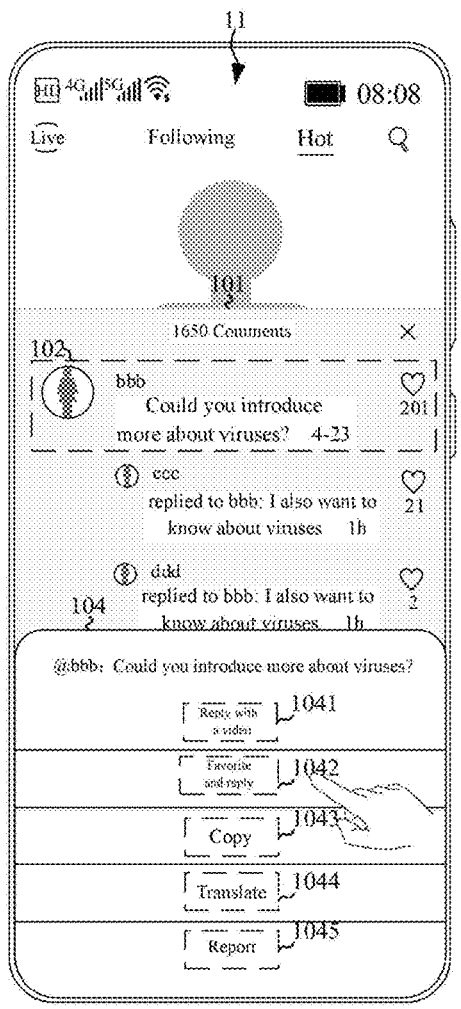
Figure 1D:
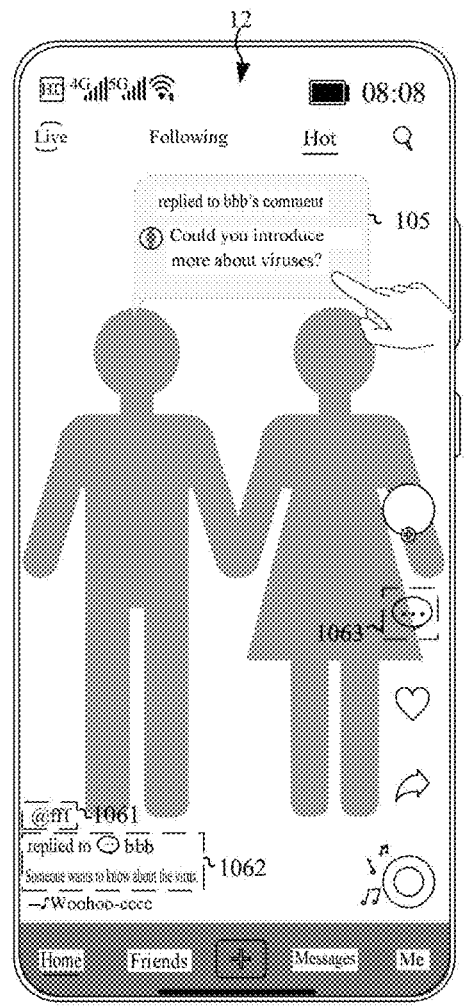
Figure 1E:
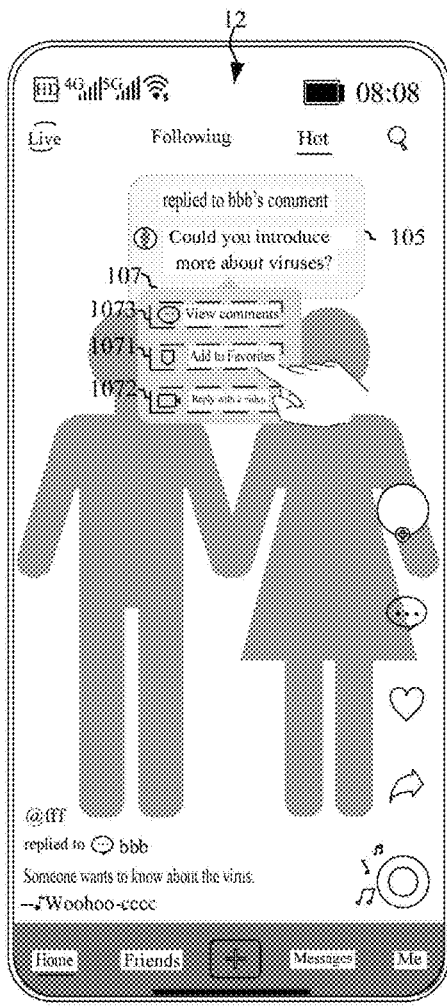
Figure 1F:
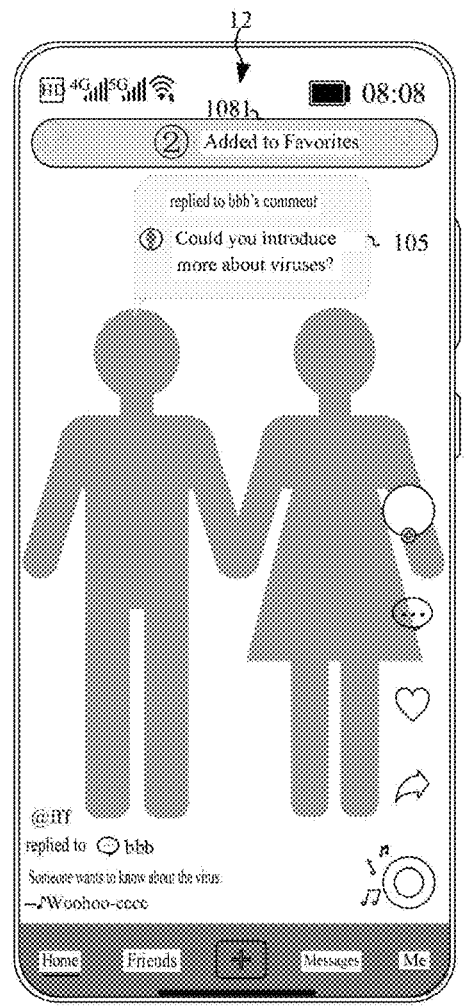
Figure 1G:
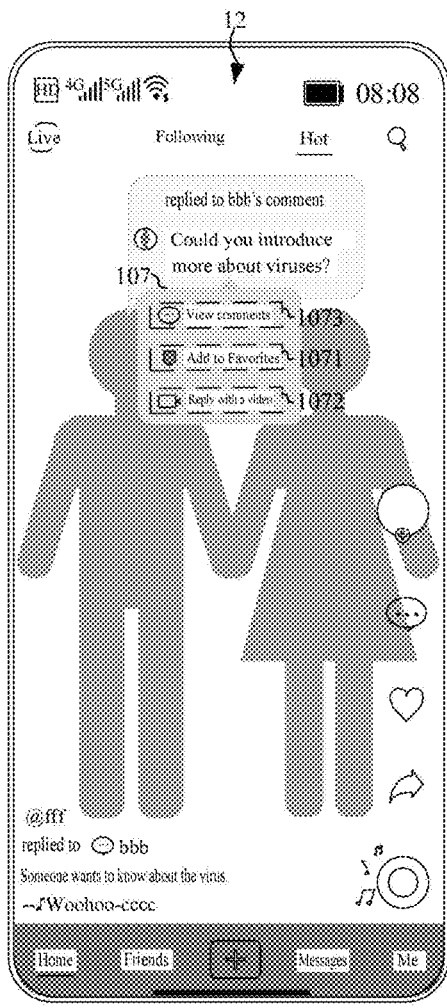
Figure 1H:
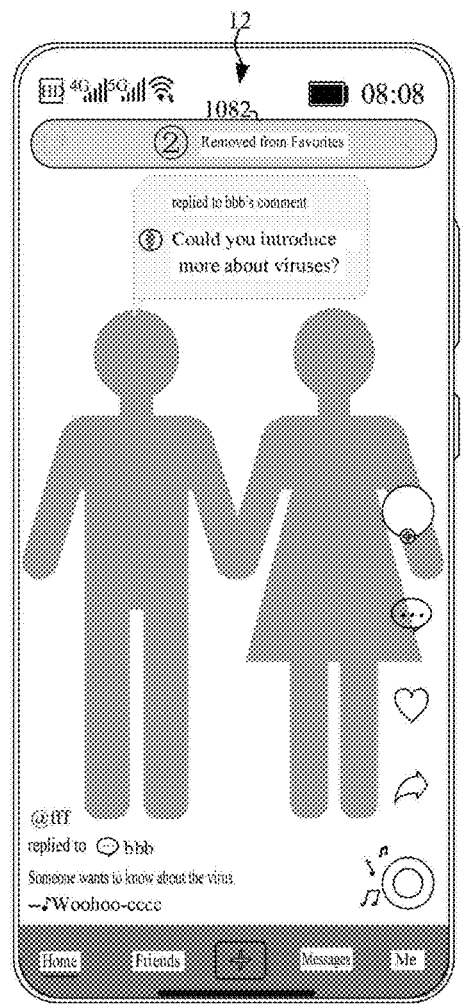
Figure 1I:
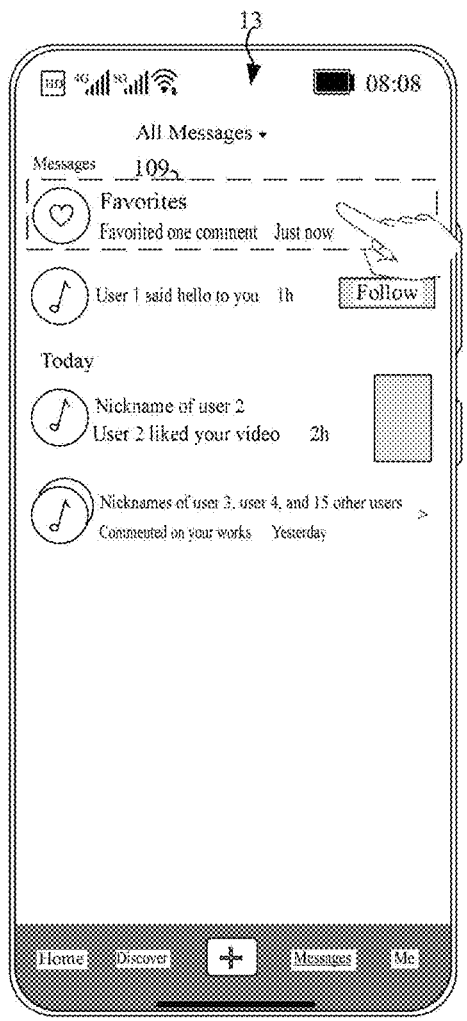
Figure 1J:
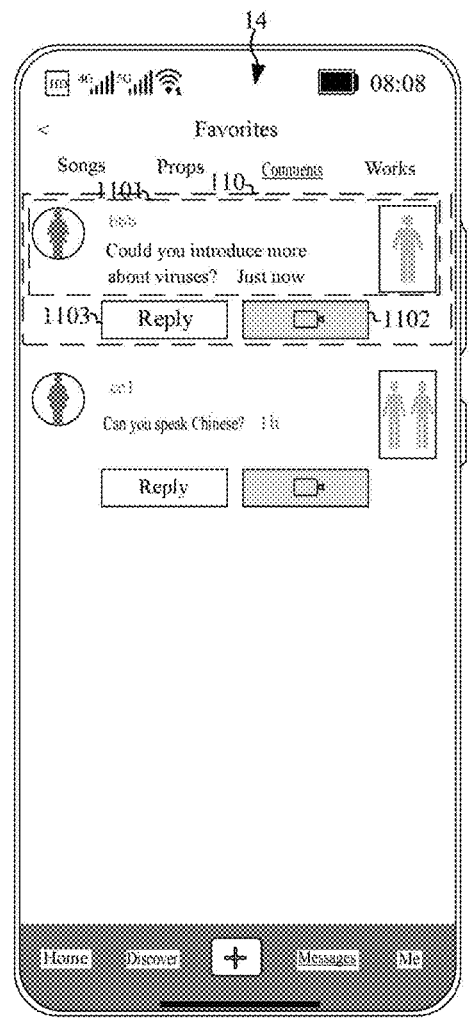
Figure 1K:
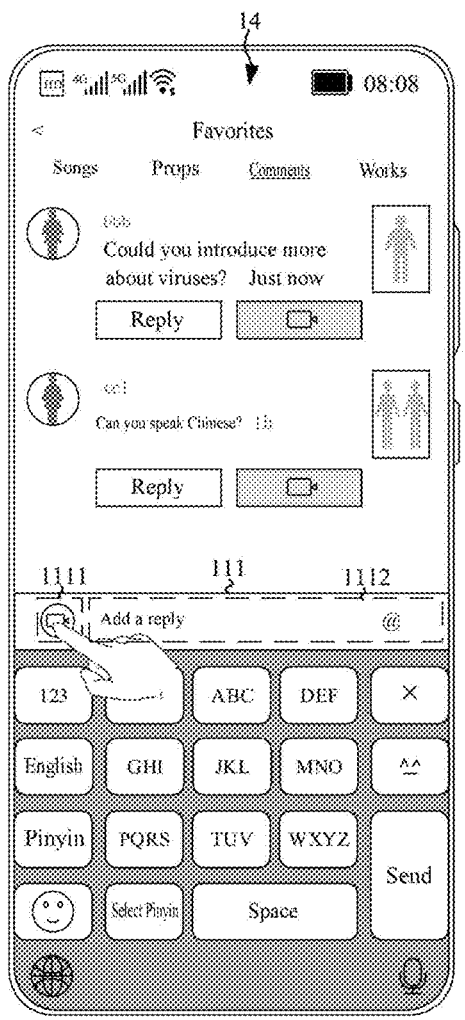
Figure 1L:
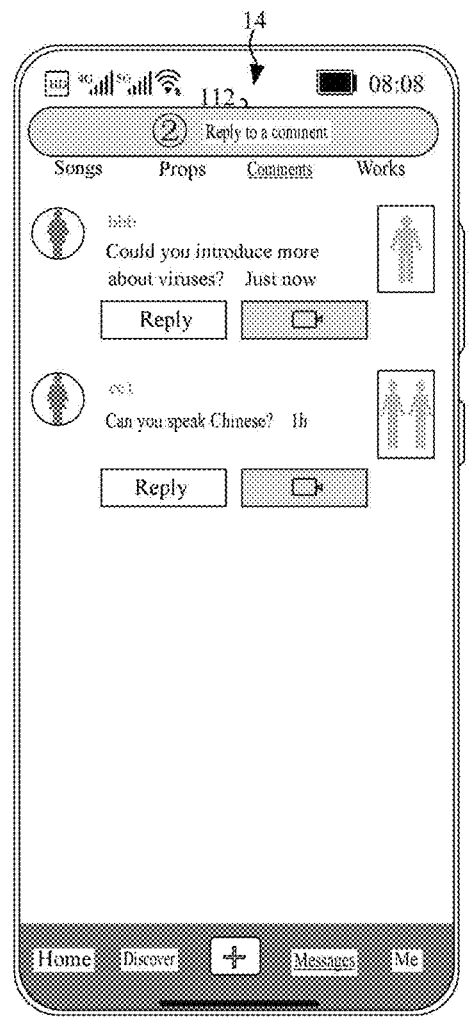
Figure 1M:
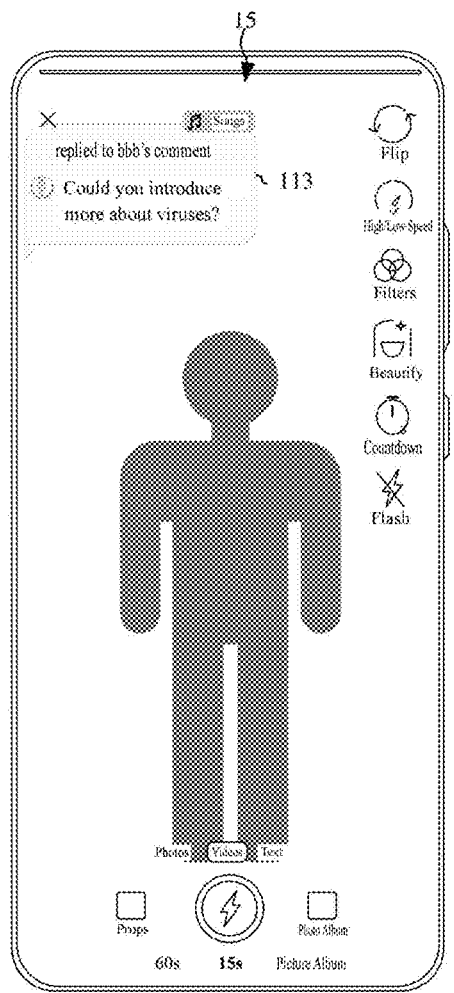
Figure 1N:
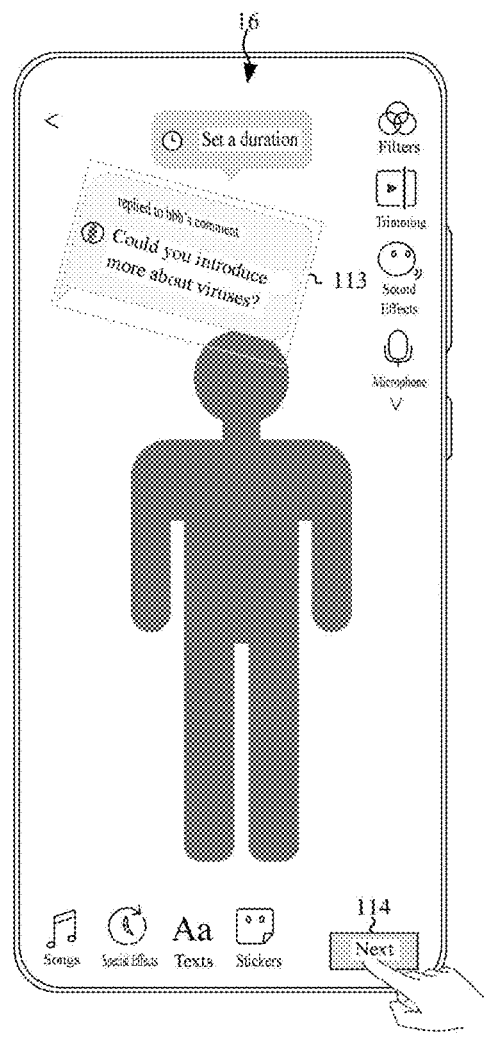
Figure 1O:
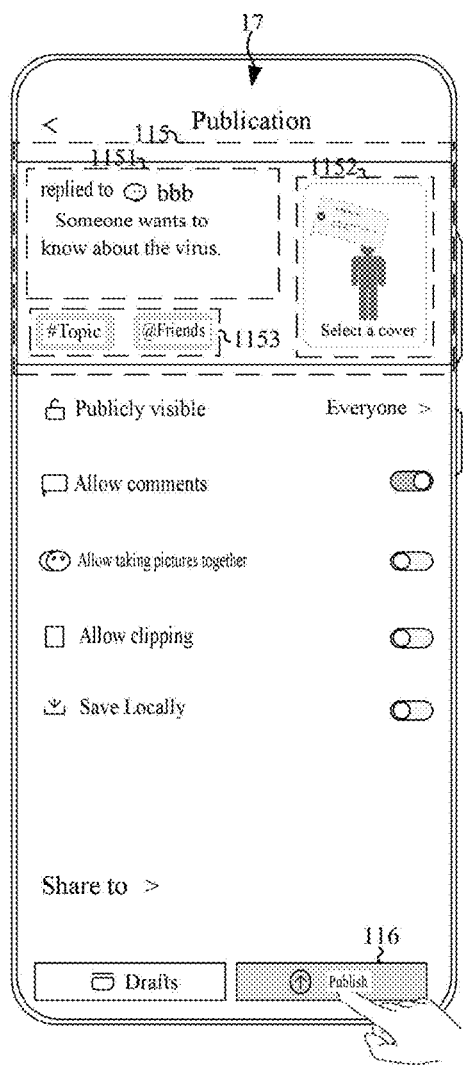
Figure 1P:
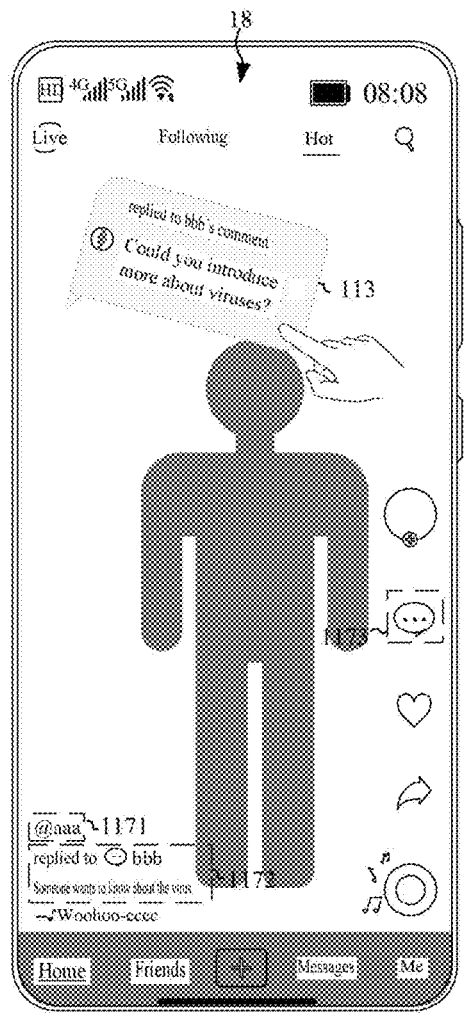
Figure 1Q:
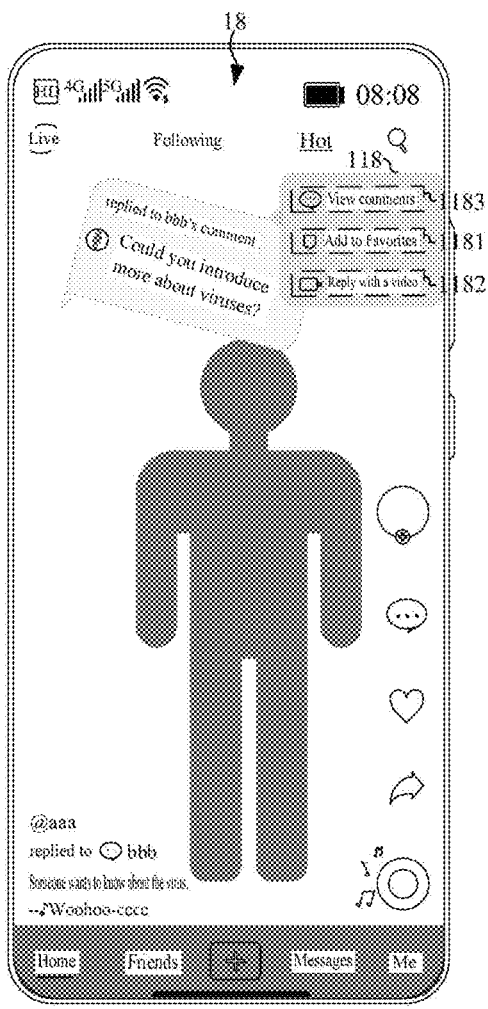
Figure 1R:
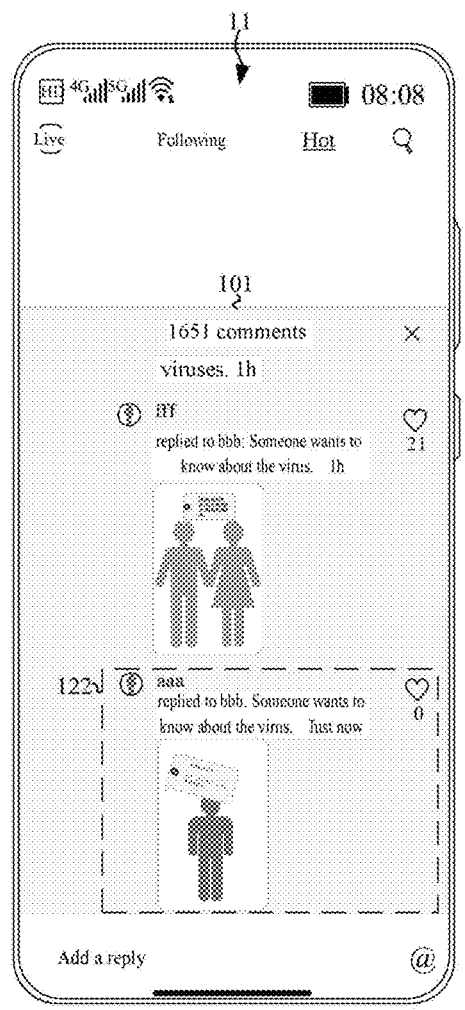
Figure 1S:
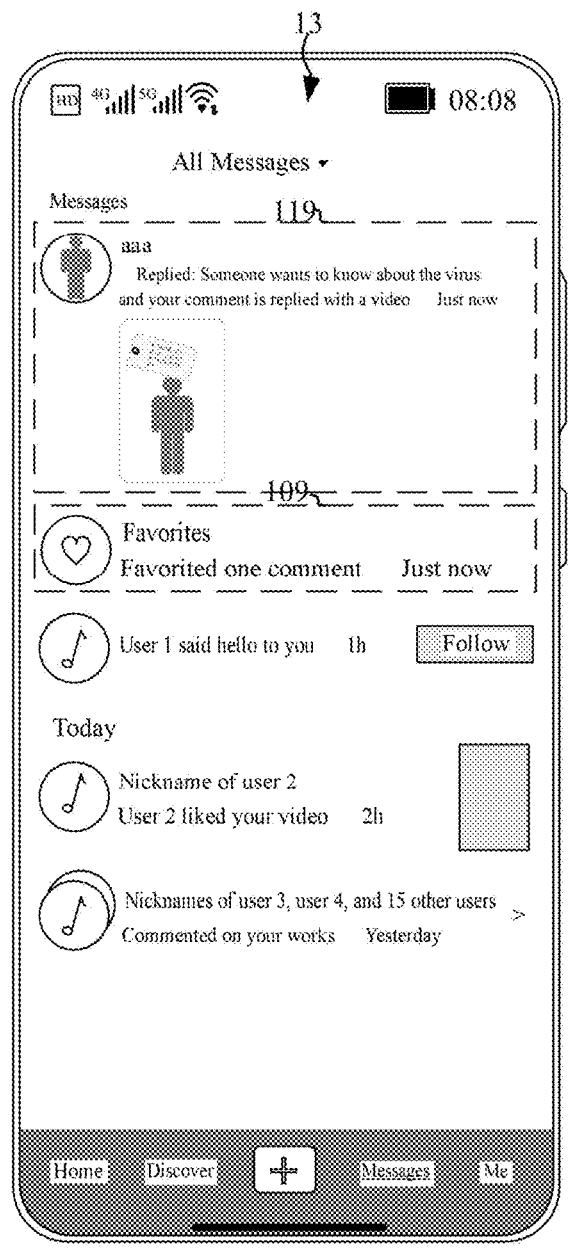
Figure 1T:
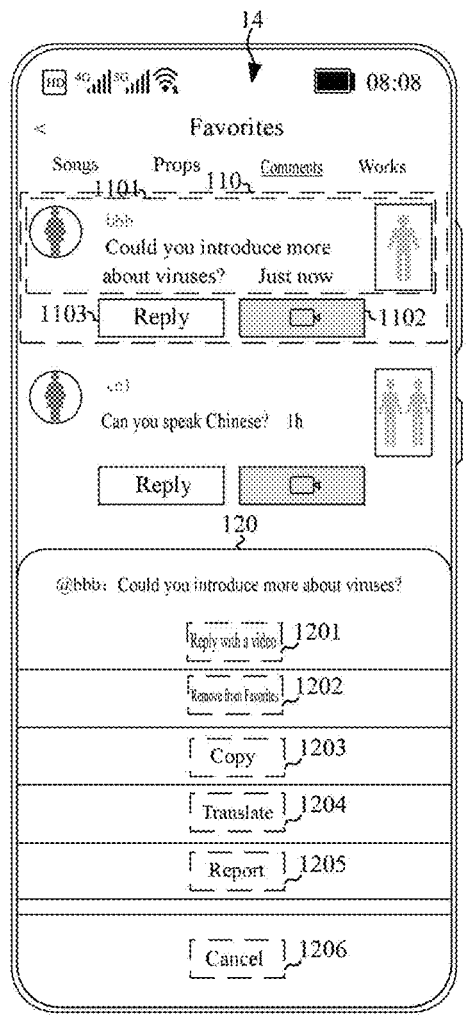
Figure 1U:
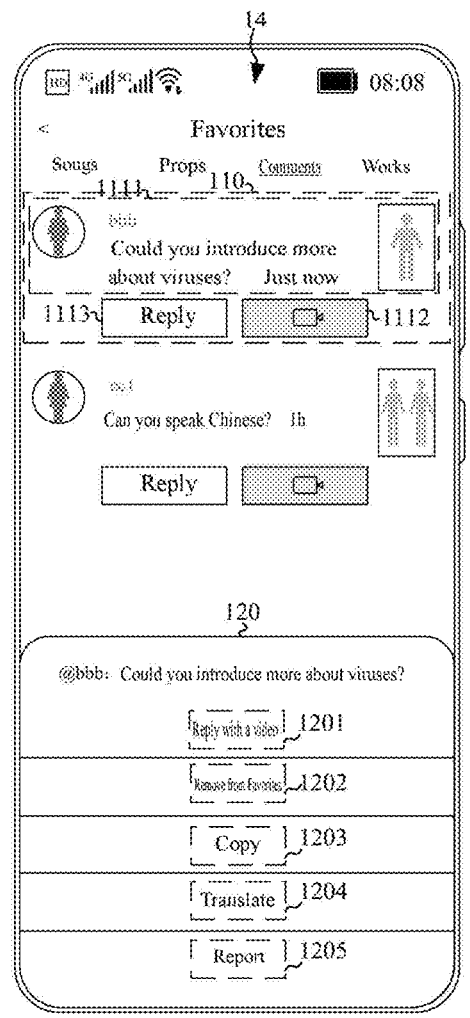
Figure 1V:
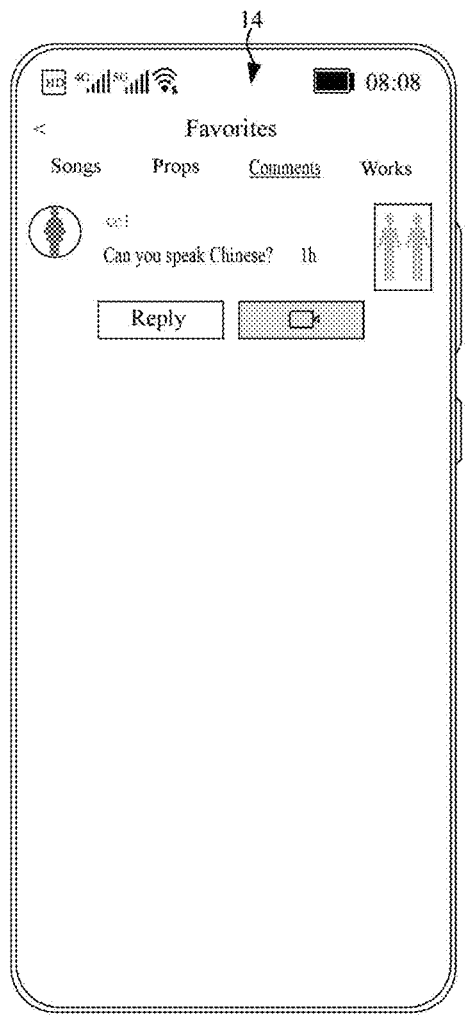
Figure 1W:
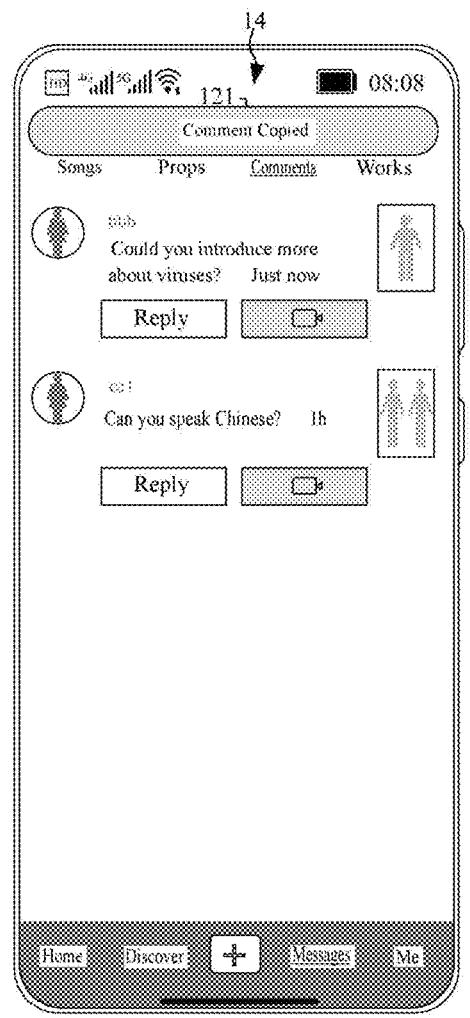
Figure 1X:
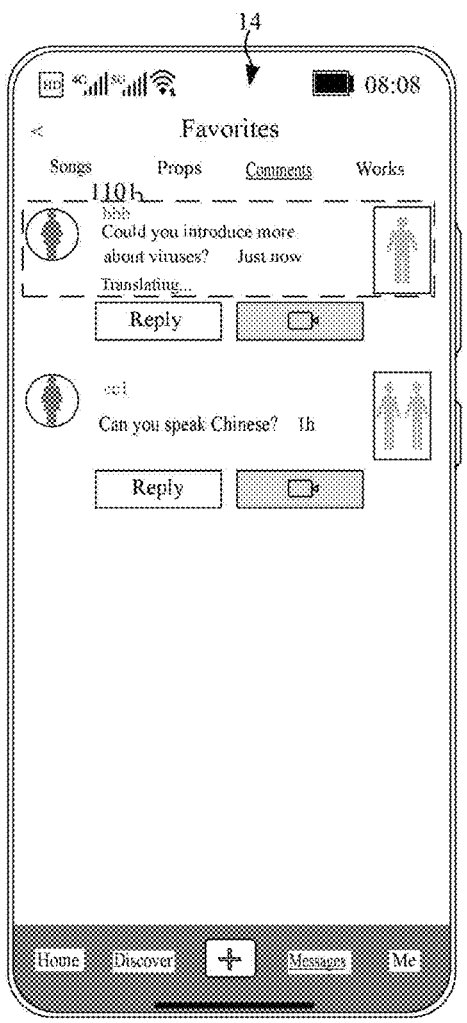
Figure 1Y:
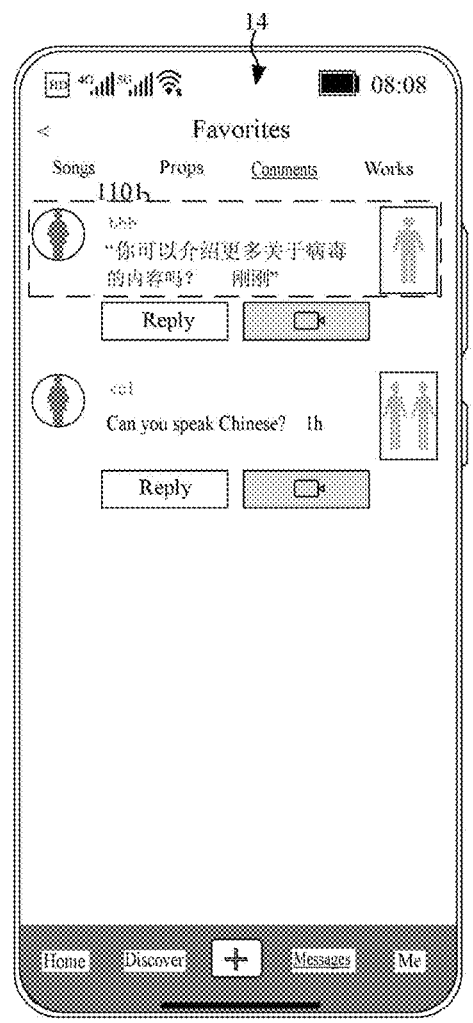

Reference is made to FIG. 1A to FIG. 1Y, which are schematic diagrams of human-computer interaction interfaces according to embodiments of the present disclosure.

1. Favoriting the comment 1 in a comment area of a playing page 1

When the mobile phone is in a vertical screen state, the application 1 may display a user interface 11 shown in FIG.

1A on the mobile phone, and the user interface 11 is used for displaying the comment area of the playing page 1 in the application 1.

The playing page 1 is one page in the application 1. The playing page 1 is used for playing a video 1, i.e., is a playing interface of the video 1, and is used for triggering display of the comment area (i.e., the comment area of the playing interface of the video 1) of the playing page 1. In addition, the playing page 1 is further used for displaying a publisher of the video 1, triggering display of another playing page, and so on. In the present disclosure, specific implementations of the playing page 1 and the video 1 are not limited.

The comment area of the playing page 1 is used for commenting on and/or replying to page content in the playing page 1 and displaying a comment, a question and a reply of the page content in the playing page 1. The page content in the playing page 1 may include, but is not limited to: the video 1, the publisher of the video 1, the comments of the video 1, the replies corresponding to the comments of the video 1, etc. In the present disclosure, specific implementations of the playing page 1, the video 1, and the comment area of the playing page 1 are not limited.

In some embodiments, the comment area of the playing page 1 is displayed in a lower area of the playing page 1, and in the comment area of the playing page 1, a plurality of comments may be displayed in order of parameters such as a publishing time and/or a like count.

In FIG. 1A, the user interface 11 may include: a window 101, which is used for displaying the comment area of the playing page 1. The window 101 may include: an area 102, which is used for displaying the comment 1 and providing entries to processing the comment 1, such as reply with a video, favorite, copy, translate, report, delete, etc., the comment 1 being content of a comment on the video 1. In the present disclosure, a specific implementation of the comment 1 is not limited. In some embodiments, the comment 1 may be represented by using relevant information such as an account avatar of the publisher of the comment 1, an account nickname (exemplified by "bbb") of the publisher of the comment 1, reply text 1 (exemplified by "could you introduce more about viruses?") and comment time point of the comment 1, a like identification and a like count of the comment 1, and the like.

After receiving an operation having a duration greater than a first duration performed by a user in the window 101 shown in FIG. 1A, such as in the area 102, if the video 1 and/or the comment 1 in the playing page 1 are published by the user 1, the application 1 may, on the window 101, display a window 104 exemplarily shown in FIG. 1B. If the video 1 and comment 1 in the playing page 1 are not published by the user 1, the application 1 may, on the window 101, display a window 104 exemplarily shown in FIG. 1C.

The user 1 is a user currently logging in an account in the application 1. In the present disclosure, a specific value of the first duration is not limited.

The window 104 is used for displaying a comment selected in the comment area of the playing page 1, which is displayed by, for example, using the account nickname of the publisher of the comment 1 and specific content of the comment 1, and the like, and for providing an entry to favoriting the comment. In the present disclosure, a specific implementation of the window 104 is not limited. Favoriting the comment, which is mentioned in this disclosure, may be understood as favoriting (i.e., collecting) the comment and the favorited comment may be replied in a favorites page.

In FIG. 1B and FIG. 1C, the window 104 may include: an option 1042, which is used for favoriting a comment. In this disclosure, a specific implementation of the option 1042 is not limited. In some embodiments, the option 1042 may be represented by using an icon and/or text or the like.

In addition, the window 104 may be further used for providing entries to, in addition to favoriting the comment, for example, replying in a text form and/or a multimedia form, replying in a multimedia form, copying, translating, reporting, pinning a comment (or fixing a comment), managing a plurality of comments, viewing more related comments, and the like.

In FIGS. 1B and 1C, the window 104 may further include: an option 1041, an option 1043, an option 1044, and an option 1045.

The option 1041 is used for replying to the comment in the multimedia form; the option 1043 is used for copying the comment; the option 1044 is used for translating the comment; the option 1045 is used for reporting the comment. In the present disclosure, specific implementations of the options 1041, 1043, 1044, and 1045 are not limited. In some embodiments, the options 1041, 1043, 1044, and 1045 each may be represented by using an icon and/or text or the like.

In addition, the window 104 shown in FIG. 1B is different from the window 104 shown in FIG. 1C in that: compared with the window 104 shown in FIG. 1C, the window 104 shown in FIG. 1B is further used for providing an entry to deleting the comment.

In FIG. 1B, the window 104 may further include: an option 1046, which is used for deleting the comment. In the present disclosure, a specific implementation of the option 1046 is not limited. In some embodiments, the options 1046 may be represented by using an icon and/or text or the like.

After receiving an operation performed by the user in the window 104 shown in FIG. 1B or FIG. 1C, such as clicking on the option 1042, the application 1 may favorite the comment 1, so that the user may reply to the favorited comment 1 in the favorites page.

Therefore, the application 1 can implement favoriting the comment 1.

2. Favoriting the comment 1 in a playing page 2

In FIG. 1A, the window 101 may further include: an area 103, which is used for displaying a comment 2, and providing entries to processing the comment 2, for example, reply with a video, favorite, copy, translate, report, delete, and the like, the comment 2 being content in reply to the comment 1. In the present disclosure, a specific implementation of the comment 2 is not limited. In some embodiments, the comment 2 may be represented by using relevant information such as an account avatar of a publisher of the comment 2, an account nickname (exemplified by "fff") of the publisher of the comment 2, reply text 2 (exemplified by "someone wants to know about the viruses") and comment time point of the comment 2, a card (exemplified by a thumbnail jointly formed by a playing picture (such as a cover) of a video 2 and a sticker 2 containing the comment 1, wherein the sticker 2 may be displayed on the above playing picture in a floating manner) of the comment 2, a like identification and a like count of the comment 2, and the like.

After receiving an operation performed by the user in the window 101 shown in FIG. 1A, such as clicking on the area 103, the application 1 may, on the mobile phone, display a user interface 12 exemplarily shown in FIG. 1D, the user interface 12 being used for displaying the playing page 2 in the application 1. In the present disclosure, a specific implementation of the user interface 12 is not limited.

The playing page 2 is one page in the application 1. The playing page 2 is used for playing the video 2, i.e., is a playing interface of the video 2, and is used for displaying the sticker 2 containing the comment 1 on the playing interface of the video 2. The video 2 is multimedia content with which the comment 1 is replied in the multimedia form. The sticker 2 serves as an entry to replying to the comment 1 again in the multimedia form.

In addition, the playing page 2 is further used for triggering display of a comment area (i.e., a comment area of the playing interface of the video 2) of the playing page 2, displaying the publisher of the video 2, triggering display of another playing page, and the like. In the present disclosure, specific implementations of the playing page 2, the video 2, and the sticker 2 are not limited.

In FIG. 1D, the user interface 12 may further include: an area 105.

The area 105, which is in a non-transparent state, is used for displaying the sticker 2 containing the comment 1 and providing entries to replying to the comment 1 in the multimedia form, favoriting the comment 1, viewing the comment 1, etc. In the present disclosure, a specific implementation of the area 105 is not limited.

In the present disclosure, display parameters of the sticker 2, for example, a display manner such as a shape, color, a animation effect and the like, a display position, a display duration and the like, are not limited. In some embodiments, the display position of the sticker 2 does not obscure or minimally obscures the playing picture of the video 2.

In the present disclosure, a specific implementation of displaying the comment 1 in the sticker 2 is not limited. In some embodiments, in the sticker 2, relevant information of the comment 1, such as the account avatar of the publisher, the account nickname (exemplified by "bbb" in FIG. 1D) of the publisher, the specific content (exemplified by "could you introduce more about viruses" in FIG. 1D), and the like may be displayed. The specific content of the comment 1 may be completely or briefly displayed in a representation manner such as text, picture, and the like.

In addition, in FIG. 1D, the user interface 12 may further include: an area 1061, an area 1062, and a control 1063.

The area 1061 is used for displaying the publisher having replied to the comment 1 in the multimedia form (i.e., the publisher of the video 2 played in the playing page 2), for example, in the form of "@+an account nickname of a user". In addition, after receiving a trigger operation such as a click performed on the area 1061 by the user, the application 1 may jump from the playing page 2 to an account page of the publisher.

The area 1062 is used for displaying the publisher of the comment 1, for example, in the form of "replied to +reply identification+the account nickname of the publisher of the comment 1". In addition, after the publisher having replied to the comment 1 in the multimedia form has replied to the comment 1 in the multimedia form by using reply text, in the area 1062, reply text 2 replied by the publisher having replied to the comment 1 in the multimedia form, for example, "someone wants to know about the viruses" is further displayed.

The control 1063 is used for triggering display of the comment area of the playing page 2. The comment area of the playing page 2 is used for commenting on or replying to page content in the playing page 2. The page content in the playing page 2 may include, but is not limited to: content of a comment on the video 2 and content in reply to the comment on the video 2. In the present disclosure, a specific implementation of the comment area of the playing page 2 is not limited.

In some embodiments, the comment area of the playing page 2 is displayed in a lower area of the playing page 2, and a plurality of comments may be displayed in the comment area of the playing page 2 in order of parameters such as a publishing time point and/or a like count.

After receiving an operation performed by the user in the user interface 12 shown in FIG. 1D, such as clicking on the area 105, the application 1 may, on the user interface 12, display an area 107 exemplarily shown in FIG. 1E, the area 107 being used for triggering display of entries to, for example, replying to a comment in the multimedia form, favoriting a comment, viewing a comment, and the like. In the present disclosure, a specific implementation of the area 107 is not limited. In some embodiments, a display position of the area 107 does not obscure or minimally obscures the playing picture of the video 2.

In FIG. 1E, the area 107 may include: an option 1071 in a first state. The option 1071 in the first state is used for providing an entry to favoriting the comment 1. The option 1071 may be represented by using, for example, an icon and/or text, or the like. In addition, a display position of the option 1071 does not obscure or minimally obscures the playing picture of the video 2.

In addition, in FIG. 1E, the area 107 may further include: an option 1072 and an option 1073.

The option 1072 is used for providing an entry to replying to the comment 1 in the multimedia form. The option 1072 may be represented by using, for example, an icon and/or text, or the like.

The option 1073 is used for providing an entry to viewing the comment 1, so as to trigger the display of the window 101 shown in FIG. 1A and display the comment card corresponding to the video 2 in the area 103 in the window 101. The option 1073 may be represented by using, for example, an icon and/or text, or the like.

It should be noted that, in addition to jumping from the window 101 shown in FIG. 1A to the user interface 12 shown in FIG. 1D, the application 1 may further jump from the user interface 12 shown in FIG. 1D to the window 101 shown in FIG. 1A by triggering the option 1073 shown in FIG. 1E.

Therefore, the application 1 can switch between the comment areas of the playing page 2 and the playing page 1, which enables quick viewing of the comment 1 and the comment 2 associated with the comment 1, and improves the readability of the comment and the convenience of comment viewing.

After receiving an operation performed by the user in the area 107 shown in FIG. 1E, such as clicking on the option 1071, the application 1 may favorite the comment 1, so that the user may reply to the favorited comment 1 in the favorites page.

In addition, after having favorited the comment 1, the application 1 may, on the user interface 12, display an area 1081 exemplarily shown in FIG. 1F, for prompting that the comment 1 has been favorited. In the present disclosure, a specific implementation of the area 1081 is not limited. In some embodiments, the area 1081 may be represented by using an icon and/or text, or the like. Therefore, the application 1 can prompt the user that the comment 1 has been favorited.

In addition, after having favorited the comment 1, and after receiving an operation such as clicking on the area 105 performed by the user in the user interface 12 shown in FIG. 1E or 1F, the application 1 may, on the user interface 12, display an area 107 exemplarily shown in FIG. 1G.

In FIG. 1G, the area 107 may include: an option 1071 in a second state, which is used for providing an entry to removing the favorited comment 1.

After receiving an operation performed by the user in the area 107 shown in FIG. 1G, such as clicking on the option 1071, the application 1 may, on the user interface 12, display an area 1082 exemplarily shown in FIG. 1H, for prompting that the favorited comment 1 has been removed. In the present disclosure, a specific implementation of the area 1082 is not limited. In some embodiments, the area 1082 may be represented by using an icon and/or text, or the like.

Therefore, the application 1 can prompt the user that the favorited comment 1 has been removed.

3. A favorites page

After having favorited the comment 1, the user may view the favorites page on which the comment 1 is displayed.

For example, the application 1 may, on the mobile phone, display a user interface 13 exemplarily shown in FIG. 1I, the user interface 13 being used for displaying a message page in the application 1. In the present disclosure, a specific implementation of the user interface 13 is not limited.

The message page is one page in the application 1. The message page is used for displaying notification messages of various types such as favorites, like, comment, and the like. In the present disclosure, a specific implementation of the message page is not limited.

In FIG. 1I, the user interface 13 may include: an area 109, which is used for displaying a notification message representing the favorited comment 2. In the present disclosure, a specific implementation of the area 109 is not limited. In some embodiments, the area 109 may include: a favoriting identification, a favoriting time, a favoriting type, and the like. The favoriting type may include, but is not limited to: favorited comments, favorited songs, favorited music, favorited works (i.e., videos), favorited stickers, favorited special effects, and the like.

After receiving an operation performed by the user in the user interface 13 shown in FIG. 1I, such as clicking on the area 109, the application 1 may, on the mobile phone, display a user interface 14 exemplarily shown in FIG. 1J, the user interface 14 being used for displaying a comment favorites sub-page in the favorites page in the application 1. In the present disclosure, a specific implementation of the user interface 14 is not limited.

The favorites page is one page in the application 1. The favorites page is used for displaying favorited contents of various types such as comments, songs, special effects, works (i.e., videos), stickers and the like, and triggering a corresponding operation on the favorited contents. The favorites page is used for displaying the favorited target information. In the present disclosure, a specific implementation of the favorites page is not limited.

The comment favorites sub-page of the favorites page is used for displaying relevant information of a favorited comment, for example, displaying it by using an account avatar of a publisher of the comment, an account nickname of the publisher of the comment, specific content of the comment, time point for favoriting the comment, a thumbnail of a playing picture of multimedia content of a playing page on which the comment is, and the like, and is used for providing an entry to replying to the favorited comment.

In addition, the favorites page may further include, in addition to the comment favorites sub-page: a song favorites sub-page for displaying favorited songs, an special-effect favorites sub-page for displaying favorited special effects, and a work favorites sub-page for displaying favorited videos.

It should be noted that the comment favorites sub-page may not be provided in the favorites page together with the song favorites sub-page, the special-effect favorites sub-page, and the work favorites sub-page, and the comment favorites sub-page may be displayed separately as one page in the application 1.

In FIG. 1J, the user interface 14 may include: an area 110, which is used for displaying the favorited comment 1 and providing an entry to replying to the comment 1. In the present disclosure, a specific implementation of the area 110 is not limited.

The area 110 may include: an area 1101, a control 1102, and a control 1103.

The area 1101 is used for displaying relevant information of the comment 1, such as the account avatar of the publisher, the account nickname of the publisher, the specific content of the comment 1, the time point for favoriting the comment 1, the thumbnail of one playing picture of the video 1 of the playing page 1 on which the comment 1 is, and the like.

The control 1102 is used for replying to the comment 1 in the text form and/or multimedia form. In the present disclosure, a specific implementation of the control 1102 is not limited. In some embodiments, the control 1102 may be represented by using, for example, text, identification, icon, picture, and the like.

The control 1103 is used for replying to the comment 1 in the multimedia form. In the present disclosure, a specific implementation of the control 1103 is not limited. In some embodiments, the control 1103 may be represented by using text, identification, icon, picture, and the like.

It should be noted that, in addition to the case that the area 110 includes the area 1101, the control 1102 and the control 1103, the area 110 may instead include: the area 1101 and the control 1102, i.e., the control 1103 is omitted.

In addition, the user may, on the mobile phone, also display the user interface 14 exemplarily shown in FIG. 1J by adopting another operation for the comment 1.

3.1. Replying to the favorited comment 1 in the favorites page

After receiving an operation performed by the user in the area 110 shown in FIG. 1J, such as clicking on the control 1103, the application 1 may, on the user interface 14, display a window 111 exemplarily shown in FIG. 1K, the window 111 being used for replying to the comment 2 in the text form and/or the multimedia form. In the present disclosure, a specific implementation of the window 111 is not limited.

In FIG. 1K, the window 111 may include: a control 1111, and an input box 1112.

The control 1111 is used for providing an entry to replying to the comment 1 in the multimedia form, for example, by means of acquiring a video in real time, acquiring a video from the client, and acquiring a video from a storage module other than the client. In the present disclosure, a specific implementation of the control 1111 is not limited. In some embodiments, the control 1111 may be represented by using, for example, text, identification, icon, picture, and the like. Therefore, the application 1 may enable reply to the comment 1 in the multimedia form.

The input box 1112 is used for inputting reply text by using, for example, text, symbol, number, letter, etc. and displaying the reply text after the reply text has been inputted. In the present disclosure, a specific implementation of the input box 1112 is not limited. In some embodiments, the input box 1112 may be represented by using, for example, text, identification, icon, picture, and the like. Therefore, the application 1 may enable reply to the comment 1 in the text form.

After receiving an operation performed by the user in the window 111 shown in FIG. 1K, such as clicking on the control 1111, the application 1 may, on the user interface 14, display a window 112 exemplarily shown in FIG. 1L, the window 112 being used for prompting to reply to the comment 1. In the present disclosure, a specific implementation of the window 112 is not limited. In some embodiments, the area 112 may be represented by using an icon and/or text, or the like. Therefore, the application 1 may prompt the user to reply to the comment 1.

After having prompted the user to reply to the comment 1, the application 1 may, on the mobile phone, jump from displaying the user interface 14 shown in FIG. 1L to displaying a user interface 15 exemplarily shown in FIG. 1M, the user interface 15 being used for providing an entry to replying to the comment 1 in the multimedia form to obtain a video 3, for example, by means of real-time acquiring, acquiring from the application 1, acquiring from a storage module other than the application 1, and the like. In the present disclosure, a specific implementation of the user interface 15 is not limited.

In FIG. 1M, the user interface 15 may include: an area 113 in a translucent state.

The area 113 in the translucent state is used for forming a sticker 3 containing the comment 1 by using the sticker 2, and at this time, the area 113 cannot be triggered to adjust a display parameter of the sticker 3, so as to adjust operations of, for example, moving, deleting, resizing, setting a display duration, displaying transparency, rotating and the like. For a specific implementation of the area 113, reference may be made to the description of the area 105 in FIG. 1D, which is not repeated herein.

It should be noted that, after receiving an operation performed by the user in the window 111 shown in FIG. 1K, such as clicking the control 1111, the application 1 may also not display the window 112 shown in FIG. 1L, and may jump directly to the user interface 15 exemplarily shown in FIG. 1M, in addition to displaying the window 112 shown in FIG. 1L first and then jumping to the user interface 15 exemplarily shown in FIG. 1M.

After having acquired the video 3 through the user interface 15, the application 1 may, on the mobile phone, display a user interface 16 exemplarily shown in FIG. 1N, the user interface 16 being used for performing an edit operation on the acquired video 3.

In addition, the user interface 16 is further used for acquiring the display parameters of the sticker 3, such as display manner, display position, display transparency, display duration, and the like for adjustment. In the present disclosure, a specific implementation of the user interface 16 is not limited.

In FIG. 1N, the user interface 16 may include: an area 113 in a non-transparent state.

The area 113 in the non-transparent state is used for displaying the sticker 3 containing the comment 1, and at this time, the area 113 may be triggered by using the operation of, for example, moving, deleting, resizing, setting a display duration, displaying transparency, rotating, and the like, so as to enable the adjustment of the display parameters of the sticker 3.

Therefore, through the change of the transparency of the area 113, it is convenient for the user to determine whether the display parameters of the sticker 3 may be adjusted in the current interface.

The display parameters of the sticker 3, for example, a display manner such as shape, color, animation effect, and the like, a display position, and a display duration, etc., are not limited in the present disclosure. In some embodiments, the display position of the sticker 3 does not obscure or minimally obscures the playing picture of the video 3.

In the present disclosure, a specific implementation of displaying the comment 1 in the sticker 3 is not limited. In some embodiments, relevant information of the comment 1, such as the account avatar of the publisher, the account nickname (exemplified by "bbb" in FIG. 1N) of the publisher, and the specific content (exemplified by "could you introduce more about viruses" in FIG. 1N) may be displayed in the sticker 3. The specific content of the comment 1 may be completely or briefly displayed by using, for example, text, picture, and the like.

In FIG. 1N, the user interface 16 may further include: a control 114, which is used for triggering display of a publication page in the application 1.

A link associated with the comment 1 may be added and displayed in the publication page, the link being used for triggering the display of the comment 1. A display manner of the link is not limited in the present disclosure. In some embodiments, the link may be presented by using, for example, "replied to +the reply identification+(the account nickname of) the publisher of the comment 1". The reply identification may be represented by using, for example, an icon, a symbol, text, a picture, or the like.

In addition, in the present disclosure, a specific implementation of displaying the comment 1 after the link has been triggered is not limited. In some embodiments, the link is used for triggering the display of the comment 1 in the comment area of the playing page 1. And in the publication page, sending, to the server, at least the video 3 and the link associated with the comment 1 may be triggered. In addition, in the publication page, sending the display parameters of the sticker 3 to the server may also be triggered. It should be noted that, if the display parameters of the sticker 3 are all default values, sending the display parameters of the sticker 3 to the server may not be triggered in the publication page.

In addition, in the publication page, the text reply content may be added to and displayed with the reply to the comment 1 in the multimedia form, and sending, to the server, the video 3, the display parameters of the sticker 3, the link associated with the comment 1, and the text reply content is triggered.

After receiving an operation performed by the user in the user interface 16 shown in FIG. 1N, such as clicking on the control 114, the application 1 may acquire at least the video 3. Therefore, the application 1 may, on the mobile phone, display a user interface 17 exemplarily shown in FIG. 1O, the user interface 17 being used for displaying the publication page. In the present disclosure, a specific implementation of the user interface 17 is not limited.

In FIG. 1O, the user interface 17 may include: an area 115 and a control 116.

The area 115 may include: an area 1151, an area 1152, and an area 1153.

The area 1151 is used for displaying a link associated with comment information 1, for example, by means of using "replied to +the reply identification+the account nickname of the publisher of the comment 1", and is used for providing a user input window for reply text, in which the reply text of the user's reply to the comment 1 may be displayed.

The area 1152 is used for presenting a cover of the video 3, for example, in the form of a card, by presenting a playing picture of the video 3 (e.g., the cover of the video 3 or one frame of the video 3) and the sticker 3 displayed on the above playing picture, by means of thumbnail, and is used for providing a function of selecting the cover of the video 3. The video 3 may be played in a playing page 3, and a sticker 3 is displayed on the playing interface of the video 3.

The area 1153 is used for providing an entry to dividing a topic to which the video 3 belongs, so that the topic to which the video 3 belongs may be displayed in the area 1153, and is used for providing an entry to selecting a specific user, which is convenient for promoting the specific user to view the video 3 played in the playing page 3.

The control 116 is used for publishing relevant information of the video 3, that is, the application 1 may send, to the server, at least the video 3 and the link associated with the comment 1, and may also send, to the server, the display parameters and/or text reply of the sticker 3.

It should be noted that, in addition to the area 115 and the control 116, the user interface 17 may be used for providing various entries to: for example, user viewing permissions for the video 3, commenting permissions for the video 3, editing permissions for the video 3, permissions as to whether the video 3 is stored in the application 1, sharing permissions for the video 3, and permissions as to whether the video 3 is stored in drafts, which are not limited in this disclosure.

After receiving an operation performed by the user in the user interface 17 shown in FIG. 1O, such as clicking on the control 116, the application 1 may send the relevant information of the video 3 to the server.

Therefore, after the application 1 has received the relevant information of the video 3 from the server, the application 1 may, on the mobile phone, display a user interface 18 exemplarily shown in FIG. 1P, the user interface 18 being used for displaying the playing page 3 in the application 1. In the present disclosure, a specific implementation of the user interface 18 is not limited.

The playing page 3 is one page in the application 1. The playing page 3 is used for playing the video 3, i.e., is a playing interface of the video 3, and is used for displaying the sticker 3 containing the comment 1 on the playing interface of the video 3. The video 3 is a video comment in reply to the comment 1 in the multimedia form. The sticker 3 serves as an entry to replying to the comment 1 again in the multimedia form.

The playing page 3 is further used for triggering display of a comment area of the playing page 3 (i.e., a comment area of the playing interface of the video 3), displaying the publisher of the video 1, triggering display of another playing page, and the like. In the present disclosure, specific implementations of the playing page 3, the video 3 and the sticker 3 are not limited.

In FIG. 1P, the user interface 18 may include: the area 113 in the non-transparent state.

The area 113 in the non-transparent state is used for displaying the sticker 3 containing the comment 1, and providing entries to, for example, replying to a comment in the multimedia form, favoriting a comment, viewing a comment, etc. In the present disclosure, a specific implementation of the area 113 is not limited.

The display parameters of the sticker 3, for example, a display manner such as shape, color, animation effect, and the like, a display position, a display duration, and the like, are not limited in the present disclosure. In some embodiments, the display position of the sticker 3 does not obscure or minimally obscures the playing picture of the video 3.

In the present disclosure, the specific implementation of displaying the comment 1 in the sticker 3 is not limited. In some embodiments, the relevant information of the comment 1, such as the account avatar of the publisher, the account nickname (exemplified by "bbb" in FIG. 1P) of the publisher, and the specific content (exemplified by "could you introduce more about viruses?" in FIG. 1P) may be displayed in the sticker 3. The specific content of the comment 1 may be completely or briefly displayed by using a representation manner of, for example, text, picture, and the like.

In addition, in FIG. 1P, the user interface 18 may further include: an area 1171, an area 1172, and a control 1173.

The area 1171 is used for displaying a publisher (i.e., a user having created the video 3) of the video 3 which is obtained by replying to the comment 1 in the multimedia form, for example, by means of using "@+the user's account nickname". In addition, after receiving a trigger operation such as clicking performed on the area 1171 by the user, the application 1 may jump from the playing page 3 to an account page of the publisher.

The area 1172 is used for displaying the link associated with the comment 1, the link being used for triggering the display of the comment 1. The display manner of the link is not limited in the present disclosure. In some embodiments, the link may be presented by using, for example, "replied to +the reply identification+the account nickname of the publisher of the comment 1". The reply identification may be represented by using, for example, an icon, a symbol, text, a picture and the like. In addition, the specific implementation of displaying the comment 1 after the link has been triggered is not limited in the present disclosure. In some embodiments, the link is used for triggering the display of the comment information 1 in the comment area of the playing page 1.

In addition, the area 1172 may also be used for displaying reply text 3 of the user's reply to the comment 1 in the multimedia form, for example, the reply text 3 is presented by using "someone wants to know about the viruses".

The control 1173 is used for triggering the display of the comment area of the playing page 3. The comment area of the playing page 3 is used for commenting on or replying to page content in the playing page 3. The page content in the playing page 3 may include, but is not limited to: content of a comment on the video 3 and content in reply to the comment on the video 3. In the present disclosure, a specific implementation of the comment area of the playing page 3 is not limited.

In some embodiments, the comment area of the playing page 3 is displayed in a lower area of the playing page 3, and a plurality of comments may be displayed in the comment area of the playing page 3 in order of parameters, such as a publishing time point and/or a like count, or the like.

In summary, the application 1 can favorite the comment 1, and reply to the favorited comment 1 in the multimedia form.

It should be noted that, in addition to replying to the comment 1 in the multimedia form, the application 1 may reply to the comment 1 in the text form, and for a specific implementation process thereof, reference may be made to a text reply process in the prior art, which is not repeated herein.

In addition, after receiving an operation performed by the user in the user interface 18 shown in FIG. 1P, such as clicking on the area 113, the application 1 may, on the user interface 18, display an area 118 exemplarily shown in FIG. 1Q, the area 118 being used for triggering display of entries to, for example, replying to a comment in the multimedia form, favoriting a comment, viewing a comment, and the like. In the present disclosure, a specific implementation of the area 118 is not limited. In some embodiments, a display position of the area 118 does not obscure or minimally obscures the playing picture of the video 3.

In FIG. 1Q, the area 118 may include: an option 1181 in the first state, which is used for providing an entry to favoriting the comment 1. The option 1181 may be represented by using, for example, an icon and/or text, or the like. In addition, a display position of the option 1181 does not obscure the playing screen of the video 3 or minimally obscures the playing screen.

In addition, in FIG. 1Q, the area 118 may further include: an option 1182 and an option 1183.

The option 1182 is used for providing an entry to replying to the comment 1 in the multimedia form. The option 1182 may be represented by using, for example, an icon and/or text, or the like.

The option 1183 is used for providing an entry to viewing the comment 1 and comments associated with the comment 1, so as to trigger the display of the area 103 in the window 101 shown in FIG. 1A. The option 1183 may be represented by using, for example, an icon and/or text, or the like.

It should be noted that, for a specific implementation of the area 108, reference may be made to the description of the area 107 shown in FIG. 1E, which is not repeated herein.

In summary, the application 1 can, on the sticker in the playing page, also provide entries to, for example, favoriting, replying to and viewing the comment 1, so that channels for providing the comments are enriched.

In addition, after receiving an operation performed by the user in the user interface 17 shown in FIG. 1O, such as clicking on the control 116, a comment 3 associated with the video 3 and the relevant information of the comment 1 may be displayed in the comment area of the playing page 1.

The comment 3 is content in reply to the comment 1. In the present disclosure, a specific implementation of the comment 3 is not limited. In some embodiments, the comment 3 may be represented by using relevant information such as an account nickname of the publisher (exemplified by "aaa") of the video 3, an account avatar of the publisher of the video 3, the publisher of the comment 1, comment time, a comment card, the like identification, a like count, and the like. The comment card may include: a thumbnail jointly formed by the playing picture of the video 3 and the sticker 3. For example, the sticker 3 may be displayed in a floating manner on the playing picture of the video 3. In addition, the comment 3 may further include: reply text 3. After receiving an operation by the user in the user interface 18 shown in FIG. 1Q, such as clicking on the option 1183, the application 1 may display the comment 3 in the comment area of the playing page 1.

Therefore, the application 1 may, in the user interface 11, display an area 122 exemplarily shown in FIG. 1R. The area 122 is used for displaying the comment 3 and providing an entry to editing the comment 3.

In summary, the application 1 can also display the comment 1 and the comment 3 associated with the comment 1 in the comment area of the playing page 1.

It should be noted that, in addition to jumping from the user interface 18 shown in FIG. 1Q to a window 101 shown in FIG. 1R, the application 1 may also jump from the window 101 shown in FIG. 1R to the user interface 18 shown in FIG. 1P by triggering the area 122, and play the video 3 in the user interface 18.

Therefore, the application 1 can switch between the comment areas of the playing page 3 and the playing page 1, which enables quick viewing of the comment 1 and the comment 3 associated with the comment 1, and improves the readability of the comments.

In addition, after the server receives, from the application 1, relevant information of the video 3 of the user's reply to the comment 1 in the multimedia form, the server may send the message 1 to a client associated with the comment 1.

The client associated with the comment 1 may include, but is not limited to: a client of publishing the comment 1, a client of liking the comment 1, a client of replying to the comment 1 in a text form and/or a multimedia form, a client of publishing an original comment corresponding to the comment 1, a client of liking the original comment corresponding to the comment 1, a client of replying to the original comment corresponding to the comment 1 in a text form and/or a multimedia form, and a client of publishing the video 1.

The message 1 is used for notifying that there is a user replying to the comment 1 in the multimedia form. In the present disclosure, a specific implementation of the message 1 is not limited.

Therefore, the application 1 may, on the user interface 13, display an area 119 exemplarily shown in FIG. 1S. The area 119 is used for displaying the message 1 in a discover page, for example, by using "an account avatar of a publisher of the playing page 3, an account nickname of the publisher of the playing page 3, reply text identification, reply time point, and a card of the publisher of the playing page 3". The card of the publisher of the playing page 3 may include: a thumbnail jointly formed by the playing interface of the video 3 (such as the cover of the video 3 or one frame of the video 3) and the sticker 3, and the sticker 3 may be displayed in a floating manner on the above playing interface.

In summary, the application 1 can also send the message 1 to the client associated with the comment 1, so that the user may learn in time that there is a user having replied to the comment 1 in the multimedia form.

3.2. Replying to the favorited comment 1 in the favorites page in the multimedia form After receiving an operation performed by the user in the area 110 shown in FIG. 1J, such as clicking on the control 1102, the application 1 may, on the mobile phone, display the user interface 15 exemplarily shown in FIG. 1M.

Therefore, the application 1 can reply to the comment 1 in the multimedia form. For the above specific process, reference may be made to the descriptions of the embodiments shown in FIG. 1M to FIG. 1S, which are not repeated herein.

It should be noted that, in addition to the above implementation, before the application 1 displays the user interface 15 shown in FIG. 1M, the application 1 may display the window 112 shown in FIG. 1L for prompting the user to reply to the comment 1.

3.3. Editing the favorited comment 1 in the favorites page

After receiving an operation having a duration greater than a second duration performed by the user in the area 110 shown in FIG. 1J, for example, in the area 1101, and, if the video 1 and/or the comment 1 in the playing page 1 is published by the user 1, the application 1 may, on the user interface 14, display a window 120 exemplarily shown in FIG. 1T. If the video 1 and the comment 1 in the playing page 1 are not published by the user 1, the application 1 may, on the user interface 14, display a window 120 exemplarily shown in FIG. 1U. In the present disclosure, a specific implementation of the window 120 is not limited.

The user 1 is the user currently logging in the account in the application 1. In the present disclosure, a specific value of the second duration is not limited.

The window 120 is used for displaying a comment selected in the comment area of the playing page 1, for example, by using, for example, the account nickname of the publisher of the comment 1 and the specific content of the comment 1, and is used for providing an entry to removing a favorited comment. In the present disclosure, a specific implementation of the window 120 is not limited. The removing the favorited comment mentioned in this disclosure may be understood as removing a comment after the comment has been favorited.

In FIGS. 1T and 1U, the window 120 may include: an option 1202, which is used for removing the favorited comment. In the present disclosure, a specific implementation of the option 1202 is not limited. In some embodiments, the option 1202 may be represented by using, for example, an icon and/or text, or the like.

In addition, the window 120 may also be used for providing entries to, in addition to removing the favorited comment, for example, replying in a text and/or multimedia form, replying in a multimedia form, copying, translating, reporting, pinning a comment (or fixing a comment), managing a plurality of comments, viewing more related comments, and the like.

In FIGS. 1T and 1U, the window 120 may further include: an option 1201, an option 1203, an option 1204, and an option 1205.

The option 1201 is used for replying to the comment in the multimedia form; the option 1203 is used for copying the comment; the option 1204 is used for translating the comment; the option 1205 is used for reporting the comment. In the present disclosure, specific implementations of the options 1201, 1203, 1204, and 1205 are not limited. In some embodiments, the options 1201, 1203, 1204, and 1205 may be represented by using, for example, icons and/or text, or the like.

In addition, the window 120 shown in FIG. 1T is different from the window 120 shown in FIG. 1U in that: compared with the window 120 shown in FIG. 1U, the window 120 shown in FIG. 1T is further used for providing an entry to cancelling the editing to a comment.

In FIG. 1T, the window 120 may further include: an option 1206, which is used for cancelling operations performed on the comment, for example, replying in a text and/or multimedia form, replying in a multimedia form, copying, translating, reporting, pinning a comment (or fixing a comment), managing a plurality of comments, viewing more related comments, and so forth. In the present disclosure, a specific implementation of the option 1206 is not limited. In some embodiments, the option 1206 may be represented by using, for example, an icon and/or text, or the like.

After receiving an operation performed by the user in the window 120 shown in FIG. 1T or FIG. 1U, such as clicking on the option 1202, the favorited comment 1 will be removed from the favorites page, and the application 1 may, on the user interface 14, no longer display the area 110, so that the application 1 may, on the mobile phone, display a user interface 14 exemplarily shown in FIG. 1V.

Therefore, the application 1 may enable the removal of the favorited comment 1 from the favorites in the favorites page.

After receiving an operation performed by the user in the window 120 shown in FIG. 1T or FIG. 1U, such as clicking on the option 1201, the application 1 may, on the mobile phone, display the user interface 15 exemplarily shown in FIG. 1M. Therefore, the application 1 may enable replying to the comment 1 in a multimedia form in the favorites page. For the above specific process, reference may be made to the descriptions of the embodiments shown in FIG. 1M to FIG. 1S, which are not repeated herein.

It should be noted that, in addition to the above implementation, before the application 1 displays the user interface 15 shown in FIG. 1M, the application 1 may display the window 112 shown in FIG. 1L for prompting the user to reply to the comment 2.

After receiving an operation of the user in the window 120 shown in FIG. 1T or FIG. 1U, such as clicking on the option 1203, the application 1 may, on the user interface 14, display a window 121 exemplarily shown in FIG. 1W, the window 121 being used for prompting that the comment 1 has been copied. In the present disclosure, a specific implementation of the window 121 is not limited. In some embodiments, the area 121 may be represented by using an icon and/or text, or the like.

Therefore, the application 1 can, in the favorites page, prompt the user that the comment 1 has been copied.

After receiving an operation performed by the user in the window 120 shown in FIG. 1T or FIG. 1U, such as clicking on the option 1204, the application 1 may, on the user interface 14, sequentially display updated areas 1101 exemplarily shown in FIG. 1X and FIG. 1Y.

The updated area 1101 shown in FIG. 1X is used for displaying a process picture of translating the comment 1, and the updated area 1101 shown in FIG. 1Y is used for displaying a result picture of translating the comment 1. In the present disclosure, a specific implementation of the updated area 1101 is not limited. In some embodiments, the updated area 1101 may be represented by using an icon and/or text, or the like.

Therefore, the application 1 can, in the favorites page, enable the translation of the comment 1.

After receiving an operation performed by the user in the window 120 shown in FIG. 1T or FIG. 1U, such as clicking on the option 1206, the application 1 may, on the mobile phone, display the user interface 14 exemplarily shown in FIG. 1J.

Therefore, the application 1 can, in the favorites page, cancel the operations on the comment 1, for example, processes such as replying in a text form and/or a multimedia form, replying in the multimedia form, copying, translating, reporting, pinning a comment (or fixing a comment), managing a plurality of comments, viewing more relevant comments, and the like.

In addition, after receiving an operation having a duration less than the second duration performed by the user in the area 110 shown in FIG. 1J, such as in the area 1101, the application 1 may, on the mobile phone, display the user interface 11 exemplarily shown in FIG. 1A, to enable the display of the comment 1 in the comment area of the playing page 1.

Based on the foregoing description, in an embodiment of the present disclosure, by taking a client as an example, the information replying method provided in the present disclosure will be elaborated in conjunction with the accompanying drawings and application scenes.

Figure 2:
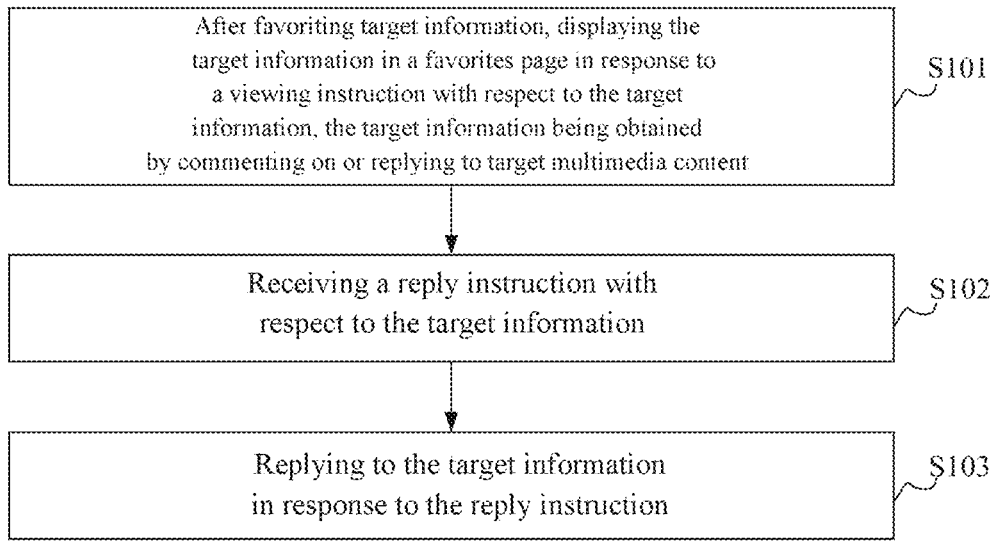
FIG. 2 is a schematic flowchart of an information replying method according to an embodiment of the present disclosure.

Reference is made to FIG. 2, which is a schematic flowchart illustrating an information replying method according to an embodiment of the present disclosure. As shown in FIG. 2, the information replying method provided in the present disclosure may comprise:

S101, after favoriting target information, displaying the target information in a favorites page in response to a viewing instruction with respect to the target information, the target information being obtained by commenting on or replying to target multimedia content.

The client may favorite the target information. The target information is obtained by commenting on or replying to the target multimedia content, that is, the target information may be information obtained by commenting on the target multimedia content, or information obtained by replying to comment information of the target multimedia content. In the present disclosure, specific implementations of the target information and the target multimedia content are not limited. In some embodiments, the target multimedia content may include, but is not limited to: audio and/or video.

For example, when the target information is obtained by commenting on the target multimedia content, for a specific implementation of the target information, reference may be made to the description of the comment 1 in the area 102 in the window 101 shown in FIG. 1A, which is not repeated herein.

Alternatively, when the target information is obtained by replying to the comment information of the target multimedia content, for the specific implementation of the target information, reference may be made to the description of the comment 1 in the area 105 shown in FIG. 1D, which is not repeated herein.

After favoriting the target information, the client may favorite the target information in the favorites page. Therefore, after receiving the viewing instruction with respect to the target information, the client may display the target information in the favorites page.

A specific implementation of the viewing instruction is not limited in the present disclosure. For example, for a specific implementation of the viewing instruction, reference may be made to the instruction received for the operation of clicking, by the user, on the area 109 in the user interface 13 shown in FIG. 1I.

The favorites page is one page in the client. The favorites page is used for displaying favorited content of various types such as comments, songs, special effects, works (i.e., videos), stickers and the like, and is used for triggering a corresponding operation on the favorited content. A specific implementation of the favorites page is not limited in the present disclosure. In some embodiments, the target information may be displayed in a comment favorites sub-page of the favorites page.

The comment favorites sub-page of the favorites page is used for displaying favorited target information by using relevant information of the target information, such as an account avatar of a publisher, an account nickname of the publisher, specific content, favorites time point, a thumbnail of a playing picture of the target multimedia content, and the like, and is used for providing an entry to replying to the favorited target information.

In addition, the favorites page may further include, in addition to the comment favorites sub-page: a song favorites sub-page, a special-effect favorites sub-page and a works favorites sub-page. The song favorites sub-page is used for displaying favorited songs. The special-effect favorites sub-page is used for displaying favorited special effects. The works favorites sub-page is used for displaying favorited videos.

It should be noted that the comment favorites sub-page may not be provided in the favorites page together with the song favorites sub-page, the special-effect favorites sub-page, and the work favorites sub-page, and the comment favorites sub-page may be displayed separately as one page in the client. For example, for a specific implementation of the favorites page, reference may be made to the description of the user interface 14 in FIG. 1J, and for the specific implementation of the target information, reference may be made to the description of the comment 1 in the area 110 shown in FIG. 1J, which is not repeated herein.

S102, receiving a reply instruction with respect to the target information.

The user may perform operations of various types such as clicking, double-clicking, long-pressing, swiping, etc., with respect to the target information in a screen of the electronic device. The electronic device may detect the operations and convert the operations into the reply instruction. Therefore, the electronic device may send the reply instruction to the client, so that the client may determine that the user has replied to the target information based on the reply instruction.

In the present disclosure, a specific implementation of the reply instruction is not limited. For example, for a specific implementation of the reply instruction, reference may be made to the instruction received in response to the operation of clicking, by the user, on the control 1111 in the window 111 shown in FIG. 1K.

Alternatively, for the specific implementation of the reply instruction, reference may be made to the instruction received in response to the operation of clicking, by the user, on the input box 1112 in the window 111 shown in FIG. 1K.

Alternatively, for the specific implementation of the reply instruction, reference may be made to the instruction received in response to the operation of clicking, by the user, on the control 1102 in the area 1101 shown in FIG. 1J.

Alternatively, for the specific implementation of the reply instruction, reference may be made to the instruction received in response to the operation of clicking, by the user, on the option 1201 in the window 120 shown in FIG. 1T or FIG. 1U.

S103, replying to the target information in response to the reply instruction.

After receiving the reply instruction, the client may reply to the target information.

The replying to the target information, which is mentioned herein, may be understood as replying to the target information in a text form or a multimedia form. The replying in the text form may be replying to the target information by using, for example, text, a symbol, a number, a letter, a picture, a moving picture, and the like. The replying in the multimedia form may be replying to the target information by using multimedia content, or by using the multimedia content and reply text. The reply text may be in a form of, for example, text, a symbol, a number, a letter, etc.

For example, for specific implementations of the above step, reference may be made to the description that the application 1 enables replying to the comment 1 in the multimedia form based on the descriptions of the embodiments shown in FIG. 1L to FIG. 1Q, after the operation of clicking, by the user, on the control 1111 in the window 111 shown in FIG. 1K.

Alternatively, for the specific implementations of the above step, reference may be made to the description that the application 1 enables replying to the comment 1 in the text form after the operation of clicking, by the user, on the input box 1112 in the window 111 shown in FIG. 1K.

Alternatively, for the specific implementations of the above step, reference may be made to the description that the application 1 enables replying to the comment 1 in the multimedia form based on the descriptions of the embodiments shown in FIG. 1L to FIG. 1Q, after the operation of clicking, by the user, on the control 1102 in the area 110 shown in FIG. 1J.

Alternatively, for the specific implementations of the above step, reference may be made to the process in which the application 1 replies to the comment 1 in the multimedia form based on the descriptions of the embodiments shown in FIG. 1L to FIG. 1Q, after the operation of clicking, by the user, on the option 1201 in the window 120 shown in FIG. 1T or FIG. 1U.

According to the information replying method provided in the present disclosure, after favoriting the target information, the client may, in response to the viewing instruction with respect to the target information, display the target information in the favorites page. After receiving the reply instruction with respect to the target information, the client may reply to the target information. Therefore, with the help of the favorited information, replying to the information again may be enabled, which reduces the complexity of the user operation, helps to enrich channels for providing replies, enhances the user's interest in replying to the information, and helps to improve probability of creating and publishing a video by the user.

Based on the descriptions of the above embodiments, there may be various ways to generate the reply instruction.

In some embodiments, the favorites page may include: a first control. The first control is used for replying to the target information in the text form and/or the multimedia form. A specific implementation of the first control is not limited in the present disclosure. In some embodiments, the first control may be represented by using, for example, text, identification, an icon, a picture, or the like.

In summary, the reply instruction received by the client may be an instruction corresponding to a trigger operation performed on the first control by the user. A type of the trigger operation herein includes, but is not limited to, clicking, double-clicking, long-pressing, swiping, or the like.

For example, for a specific implementation of the first control, reference may be made to the description of the control 1111 in the window 111 shown in FIG. 1K, and correspondingly, for the specific implementation of the reply instruction, reference may be made to the instruction received by the application 1 by clicking on the control 1111 in the window 111 shown in FIG. 1K after the operation of clicking, by the user, on the control 1103 in the area 110 shown in FIG. 1J.

Alternatively, for the specific implementation of the first control, reference may be made to the description of the input box 1112 in the window 111 shown in FIG. 1K, and correspondingly, for the specific implementation of the reply instruction, reference may be made to the instruction received by the application 1 by clicking on the input box 1112 in the window 111 shown in FIG. 1K after the operation of clicking, by the user, on the control 1103 in the area 110 shown in FIG. 1J.

In other embodiments, the favorites page may include: a second control, wherein the second control is used for replying to the target information in the multimedia form. A specific implementation of the second control is not limited in the present disclosure. In some embodiments, the second control may be represented by using, for example, text, identification, an icon, a picture, or the like. In addition, the first control and the second control may be displayed together in the favorites page.

In summary, the reply instruction received by the client may be an instruction corresponding to a trigger operation performed on the second control by the user. A type of the trigger operation herein includes, but is not limited to, clicking, double-clicking, long-pressing, swiping, or the like.

For example, for a specific implementation of the second control, reference may be made to the description of the control 1102 in the area 110 shown in FIG. 1J, and correspondingly, for the specific implementation of the reply instruction, reference may be made to the instruction received in response to the operation of clicking, by the user, on the control 1102 in the area 110 shown in FIG. 1J.

In other embodiments, after receiving an instruction corresponding to a trigger operation having a duration greater than or equal to a preset duration performed on the target information by the user, the client may display a third control in the favorites page. A specific implementation of the third control is not limited in the present disclosure. In some embodiments, the third control may be represented by using, for example, text, identification, an icon, a picture, or the like. In addition, the third control may be displayed in a floating manner on the favorites page.

In summary, the reply instruction received by the client may be an instruction corresponding to a trigger operation performed on the third control by the user. A type of the trigger operation herein includes, but is not limited to, clicking, double-clicking, long-pressing, swiping, or the like.

For example, for a specific implementation of the instruction corresponding to the trigger operation having the duration greater than or equal to the preset duration performed on the target information by the user, reference may be made to the instruction received in response to the operation having the duration greater than or equal to the second duration performed by the user on the area 1101 in the area 110 shown in FIG. 1J; for a specific implementation of the preset duration, reference may be made to the description of the second duration; correspondingly, for a specific implementation of the third control, reference may be made to the description of the option 1201 in the window 120 shown in FIG. 1T or FIG. 1U; and for a specific implementation of the reply instruction, reference may be made to the instruction received in response to clicking, by the user, on the option 1201 in the window 120 shown in FIG. 1T or FIG. 1U.

Based on the descriptions of the above embodiments, in addition to replying to the target information, in some embodiments, after receiving the instruction corresponding to the trigger operation performed on the target information by the user and having the duration greater than or equal to the preset duration, the client may further display a fourth control in the favorites page.

A specific implementation of the fourth control is not limited in the present disclosure. In some embodiments, the fourth control may be represented by using, for example, text, identification, an icon, a picture, or the like. In addition, the third control and the fourth control may be displayed in a floating manner on the favorites page.

In summary, after receiving the instruction corresponding to the trigger operation performed on the fourth control by the user, the client may perform any of operations of cancelling the favoriting, copy, translate, report, or cancelling the editing on the target information. A type of the trigger operation herein includes, but is not limited to, clicking, double-clicking, long-pressing, swiping, or the like.

For example, when the client performs the operation of cancelling the favoriting on the target information, for a specific implementation of the fourth control, reference may be made to the description of the option 1202 in the window 120 shown in FIG. 1T or FIG. 1U, and for a specific implementation of the instruction corresponding to the trigger operation performed on the fourth control, reference may be made to the instruction received in respond to clicking, by the user, on the option 1202 in the window 120 shown in FIG. 1T or FIG. 1U.

Alternatively, when the client performs the operation of copying on the target information, for the specific implementation of the fourth control, reference may be made to the description of the option 1203 in the window 120 shown in FIG. 1T or FIG. 1U, and for the specific implementation of the instruction corresponding to the trigger operation performed on the fourth control, reference may be made to the instruction received in response to clicking, by the user, on the option 1203 in the window 120 shown in FIG. 1T or FIG. 1U.

Alternatively, when the client performs the operation of translation on the target information, for the specific implementation of the fourth control, reference may be made to the description of the option 1204 in the window 120 shown in FIG. 1T or FIG. 1U, and for the specific implementation of the instruction corresponding to the trigger operation performed on the fourth control, reference may be made to the instruction received in response to clicking, by the user, on the option 1204 in the window 120 shown in FIG. 1T or FIG. 1U.

Alternatively, when the client performs the operation of reporting on the target information, for the specific implementation of the fourth control, reference may be made to the description of the option 1205 in the window 120 shown in FIG. 1T or FIG. 1U, and for the specific implementation of the instruction corresponding to the trigger operation performed on the fourth control, reference may be made to the instruction received in response to clicking, by the user, on the option 1205 in the window 120 shown in FIG. 1T or FIG. 1U.

Alternatively, when the client performs the operation of cancellation on the target information, for the specific implementation of the fourth control, reference may be made to the description of the option 1206 in the window 120 shown in FIG. 1T or FIG. 1U, and for the specific implementation of the instruction corresponding to the trigger operation performed by the fourth control, reference may be made to the instruction received in response to clicking, by the user, on the option 1206 in the window 120 shown in FIG. 1T.

In addition, after receiving an instruction corresponding to a trigger operation having a duration less than the preset duration performed on the target information, the client may jump to the playing interface of the target multimedia content and display the target information in the comment area of the playing interface of the target multimedia content.

Specific implementations of the above instruction, the playing interface of the target multimedia content and the comment area of the playing interface of the target multimedia content are not limited in the present disclosure.

The playing interface of the target multimedia content is used for playing the target multimedia content and triggering the display of the comment area of the playing interface of the target multimedia content. In addition, the playing interface of the target multimedia content is also used for displaying the publisher of the target multimedia content, triggering display of a playing interface of another multimedia content, and the like.

The comment area of the playing interface of the target multimedia content is used for commenting on or replying to the target multimedia content and displaying the comment on and reply to the target multimedia content. Therefore, the client may switch between the favorites page and the comment area of the playing page (i.e., the playing interface of the multimedia content), which enables quick viewing of the target information and the information associated with the target information, and improves the readability of the information.

For example, for a specific implementation of the instruction corresponding to the trigger operation having the duration less than the preset duration performed on the target information, reference may be made to the instruction received in response to the operation having the duration less than the second duration performed on the area 1101 in the area 110 shown in FIG. 1J by the user, and correspondingly, for a specific implementation of the comment area of the playing interface of the target multimedia content, reference may be made to the description of the window 101 shown in FIG. 1A, and for a specific implementation of the target information, reference may be made to the description of the comment 1 in the area 102 in the window 101 shown in FIG. 1A.

Based on the descriptions of the above embodiments, the client may acquire the first multimedia content to enable replying to the target information. The first multimedia content is content in reply to the target information, and the first sticker containing the target information is displayed on the playing interface of the first multimedia content.

The first multimedia content may be obtained by using, for example, real-time acquisition, acquisition from the client, acquisition from a storage module other than the client, and the like.

The target information is displayed in the first sticker, and the first sticker serves as an entry to replying to the target information in the multimedia form. In some embodiments, display parameters of the first sticker, for example, a display manner such as shape, color, animation effect, and the like, a display position, a display duration, and the like, are not limited.

In addition, the client may also acquire the display parameters of the first sticker.

The acquisition order for the playing picture of the first multimedia content and the display parameters of the first sticker may be arbitrary. In the present disclosure, specific implementations of the playing picture of the first multimedia content and the display parameters of the first sticker are not limited. In some embodiments, the display parameters of the first sticker may include: at least one of display manner, display position or display duration.

For example, for a specific implementation of the playing interface of the first multimedia content, reference may be made to the description of the playing page 3 in FIG. 1P; for a specific implementation of the first multimedia content, reference may be made to the description of the video 3 in FIG. 1P; for a specific implementation of the target information, reference may be made to the description of the comment 1 in FIG. 1P; and for a specific implementation of the first sticker, reference may be made to the description of the sticker 3 in FIG. 1P, which are not repeated herein.

Based on the descriptions of the above embodiments, the client may, to the server, send the first multimedia content, or the first multimedia content and the first sticker, to enable publishing the first multimedia content.

Therefore, the server may send a notification message to the client associated with the target information, so that the client associated with the target information may in time learn that the user has replied to the target information in the multimedia form, which is convenient for viewing and replying again by the user through the client associated with the target information.

The notification message is used for notifying the client associated with the target information that the reply to the target information has been made in the multimedia form. In the present disclosure, a specific implementation of the notification message is not limited.

For example, for a specific implementation of the client associated with the target information, reference may be made to the description of the client associated with the comment 1 in FIG. 1S, and for a specific implementation of the notification message, reference may be made to the description of the message 1 in the area 119 in FIG. 1S, which are not repeated herein.

In summary, the client may further send the notification message to the client associated with the target information through the server, so that the client associated with the target information may in time learn that the user has replied to the favorited target information, which is convenient for viewing and replying again by the user through the client associated with the target information.

In addition, the client may play the first multimedia content and display the first sticker containing the target information. The first sticker may be displayed in a floating manner on the playing picture of the first multimedia content. And the first sticker does not obscure or minimally obscures the playing picture of the first multimedia content. Therefore, smooth playing of the first multimedia content is guaranteed.

In summary, the client may display a sticker containing one piece of target information while playing multimedia content in one playing page, which enriches the publication manner of the video.

In the present disclosure, with the help of the sticker, the client may not only provide the entry to favoriting the target information, but also provide the entry to replying to the target information in the multimedia form, but also provide the entry to viewing the target information and the information associated with the target information, so that the reusability of the sticker is improved, and the user can operate conveniently.

In some embodiments, the client may, in the comment area of the playing interface of the target multimedia content, display the first card, or the target information and the first card. The first card may include a thumbnail jointly formed by the playing picture of the first multimedia content and the first sticker.

For example, for a specific implementation of the comment area of the playing interface of the target multimedia content, reference may be made to the description of the window 101 in FIG. 1R; for a specific implementation of the first card, reference may be made to the description of the comment 3 in the area 122 in FIG. 1R; for a specific implementation of one playing picture of the first multimedia content, reference may be made to the description of one playing picture of the video 3 in FIG. 1R; for a specific implementation of the first sticker, reference may be made to the description of the sticker 3 in FIG. 1R; and for a specific implementation of the target information, reference may be made to the description of the comment 1 in the area 102 in FIG. 1A, which are not repeated herein.

In summary, after favoriting the target information, the client may display the information in reply to the target information in the comment area of the playing page on which the target information is displayed, so that the complete display of all the information is ensured, the quick viewing of the target information and the information associated with the target information is enabled, and the readability of the information is improved.

In some embodiments, the first card may further include: reply text. The reply text is content in reply to the target information.

For example, for a specific implementation of the reply text, reference may be made to the description of the reply text 3 in FIG. 1R.

In summary, the client provides the user with a variety of manners of replying to the target information in the multimedia form, which enriches the diversity of replying to the target information in the multimedia form.

Based on the descriptions of the above embodiments, since the target information has various display positions, for example, the target information may be displayed in the comment area of the playing interface of the target multimedia content, or the target information may be displayed in the sticker obtained by replying to the target information in the multimedia form, the client may favorite the target information in various manners.

Two practicable specific implementations of favoriting the target information by the client will be described in detail below.

In some embodiments, the client may display the target information in the comment area of the playing interface of the target multimedia content. After receiving the instruction corresponding to the trigger operation performed on the target information, the client may display a fifth control on the comment area of the playing interface of the target multimedia content. After receiving an instruction corresponding to a trigger operation performed on the fifth control, the client may favorite the target information.

In the present disclosure, specific implementations of the instruction corresponding to the trigger operation performed on the target information, the instruction corresponding to the trigger operation performed on the fifth control, and the fifth control are not limited.

For example, for a specific implementation of the comment area of the playing interface of the target multimedia content, reference may be made to the description of the window 101 in FIG. 1A; for a specific implementation of the target information, reference may be made to the description of the comment 1 in the area 102 in FIG. 1A; for a specific implementation of the instruction corresponding to the trigger operation performed on the target information, reference may be made to the instruction received in response to the operation of clicking, by a user, on the area 102 in the window 101 shown in FIG. 1A; for a specific implementation of the fifth control, reference may be made to the description of the option 1042 in the window 104 in FIG. 1B or FIG. 1C; and for a specific implementation of the instruction corresponding to the trigger operation performed on the fifth control, reference may be made to the instruction received in response to the operation of clicking, by the user, on the option 1042 in the window 104 shown in FIG. 1B or FIG. 1C, which are not repeated herein.

In other embodiments, the client may play the second multimedia content and display a second sticker containing the target information on a playing interface of the second multimedia content. The second multimedia content is content in reply to the target information. After receiving the instruction corresponding to the trigger operation performed on the second sticker, the client may favorite the target information.

For example, for a specific implementation of the playing interface of the second multimedia content, reference may be made to the description of the playing page 2 shown in FIG. 1D; for a specific implementation of the second multimedia content, reference may be made to the description of the video 2 shown in FIG. 1D; for a specific implementation of the target information, reference may be made to the description of the comment 1 in the area 105 in FIG. 1D; for a specific implementation of the second sticker, reference may be made to the description of the sticker 2 in the area 105 in FIG. 1D; and for a specific implementation of the instruction corresponding to the trigger operation performed on the second sticker, reference may be made to the instruction received in response to clicking, by the user, on the option 1071 in the area 107 shown in FIG. 1E, which are not repeated herein.

In summary, the client may favorite the target information in various manners.

In addition, after receiving the instruction corresponding to the trigger operation performed on the second sticker, the client may jump to the playing interface of the target multimedia content, and display a second card or the target information and the second card in the comment area of the playing interface of the target multimedia content. The second card may include: a thumbnail jointly formed by the playing picture of the second multimedia content and the second sticker.

For example, for a specific implementation of the second sticker, reference may be made to the description of the sticker 3 in the area 113 in FIG. 1P or FIG. 1Q; for a specific implementation of the instruction corresponding to the trigger operation performed by the second sticker, reference may be made to the instruction received for the operation of clicking, by the user, on the option 1183 in the area 118 in FIG. 1Q; for a specific implementation of the second card, reference may be made to the description of the comment 3 in the area 122 in FIG. 1R; and for specific implementation processes of the foregoing steps, reference may be made to the description of the embodiments shown in FIG. 1Q to FIG. 1R, which are not repeated herein.

Alternatively, for the specific implementation of the second sticker, reference may be made to the description of the sticker 2 in the area 105 in FIG. 1D or FIG. 1E; for the specific implementation of the instruction corresponding to the trigger operation performed by the second sticker, reference may be made to the instruction received for clicking, by the user, on the option 1073 in the area 107 shown in FIG. 1E; for the specific implementation of the second card, reference may be made to the description of the comment 2 in the area 103 in FIG. 1A; for the specific implementation of the target information, reference may be made to the description of the comment 1 in the area 102 in FIG. 1A; and for specific implementation processes of the foregoing steps, reference may be made to the description of the embodiments shown in FIG. 1E and FIG. 1A, which are not repeated here.

In summary, the client may switch between the comment areas of one playing page and the other playing page, so that the quick viewing of the target information and the information associated with the target information is enabled, which improves the readability of the information.

Based on the descriptions of the above embodiments, the client may acquire the second multimedia content. In addition, the client may, in the second multimedia content, also add a link associated with the target information, or the link and text reply content associated with the target information, to obtain the second multimedia content added with the link.

The link associated with the target information is used for triggering the display of the target information in the comment area of the playing interface of the target multimedia content.

For example, for the second multimedia content, reference may be made to the description of the video 3 shown in FIG. 1O; for the link associated with the target information, reference may be made to the description of the link associated with the comment 1 in the area 1151 shown in FIG. 1O; for the text reply content, reference may be made to the description of the reply text 3 in the area 1151 shown in FIG. 1O; and for the second multimedia content added with the link, reference may be made to the description of the relevant information of the video 3 shown in FIG. 1O, which are not repeated herein.

Therefore, the client may upload the second multimedia content added with the link to the server, to enable the publication of the second multimedia content added with the link, so that the client may, in the playing interface of the second multimedia content, display the link, or the link and the text reply content.

For example, for specific implementations of the foregoing steps, reference may be made to the descriptions shown in FIG. 1O to FIG. 1P, wherein for the uploading the second multimedia content added with the link, reference may be made to the description of the relevant information of the video 3 sent to the server after the operation performed by the user, such as clicking on the control 116 in the user interface 17 shown in FIG. 1O; for the displaying the link in the playing interface of the second multimedia content, reference may be made to the description of the link associated with the comment 1 in the area 1172 shown in FIG. 1P; and for the displaying the text reply content in the playing interface of the second multimedia content, reference may be made to the description of the reply text 3 in the area 1172 shown in FIG. 1P, which are not repeated herein.

In summary, the client may add various types of elements into the multimedia content, which is beneficial to enriching the playing interface of the multimedia content and improves the viewability and diversity of replies to the target information.

Exemplarily, the present disclosure provides an information replying apparatus.

Figure 3:
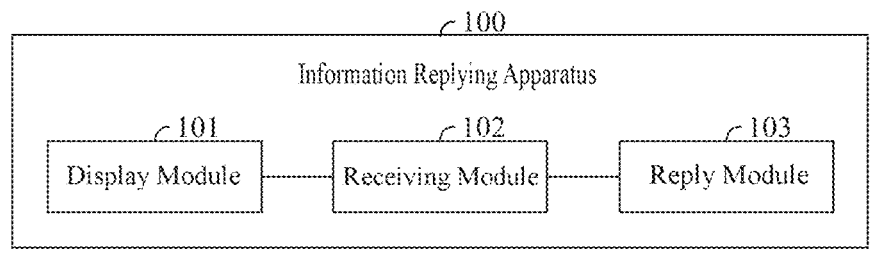
FIG. 3 is a schematic structural diagram of an information replying apparatus according to an embodiment of the present disclosure.

Reference is made to FIG. 3, which is a schematic structural diagram of an information replying apparatus according to an embodiment of the present disclosure. The information replying apparatus of the present disclosure may be disposed in a client, and may implement the client's operation corresponding to the information replying method in the above embodiments of FIG. 1A to FIG. 1Y and FIG. 2.

As shown in FIG. 3, the information replying apparatus 100 provided in the present disclosure may comprise: a display module 101, a receiving module 102, and a reply module 103.

The display module 101 is for displaying, after target information being favorited, the target information in a favorites page in response to a viewing instruction with respect to the target information, the target information being obtained by commenting on or replying to target multimedia content;

the receiving module 102 is for receiving a reply instruction with respect to the target information; and the reply module 103 is for replying to the target information in response to the reply instruction.

In some embodiments, the receiving module 102 is specifically for receiving a reply instruction corresponding to a trigger operation performed on a first control displayed in the favorites page, wherein the first control is used for replying to the target information in a text form and/or a multimedia form.

In some embodiments, the receiving module 102 is specifically for receiving a reply instruction corresponding to a trigger operation performed on a second control displayed in the favorites page, wherein the second control is used for replying to the target information in a multimedia form.

In some embodiments, the receiving module 102 is specifically for displaying a third control in the favorites page after an instruction corresponding to a trigger operation having a duration greater than or equal to a preset duration performed on the target information being received; and receive a reply instruction corresponding to a trigger operation performed on the third control.

In some embodiments, the receiving module 102 is further for displaying a fourth control in the favorites page after an instruction corresponding to a trigger operation having a duration greater than or equal to the preset duration performed on the target information being received; and receiving an instruction corresponding to a trigger operation performed on the fourth control to perform any of operations of cancelling the favoriting, copy, and translation on the target information.

In some embodiments, the receiving module 102 is further for jumping to a playing interface of target multimedia content after an instruction corresponding to a trigger operation having a duration less than the preset duration performed on the target information being received, and displaying the target information in a comment area of the playing interface of the target multimedia content, wherein the comment area of the playing interface of the target multimedia content is an area for commenting on or replying to the target multimedia content.

In some embodiments, the replying module 103 is specifically for acquiring first multimedia content, the first multimedia content being content in reply to the target information, wherein a first sticker containing the target information is displayed on a playing interface of the first multimedia content.

Figure 4:
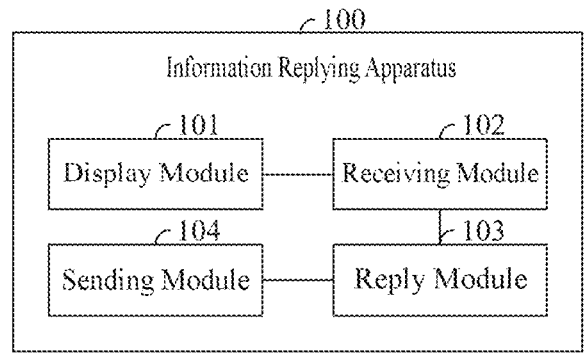
FIG. 4 is a schematic structural diagram of an information replying apparatus according to an embodiment of the present disclosure.

Reference is made to FIG. 4, which is a schematic structural diagram of an information replying apparatus according to an embodiment of the present disclosure. As shown in FIG. 4, the information replying apparatus 100 provided in the present disclosure may, on the basis of the apparatus structure shown in FIG. 3, further comprise: a sending module 104.

The sending module 104 is for sending the first multimedia content to a server, so that the server sends a notification message to a client associated with the target information, wherein the notification message is used for notifying the client associated with the target information that the target information has been replied to in a multimedia form.

In some embodiments, the display module 101 is further for displaying the target information and a first card in the comment area of the playing interface of the target multimedia content, wherein the comment area of the playing interface of the target multimedia content is an area for commenting on or replying to the target multimedia content, and the first card comprises a thumbnail jointly formed by a playing picture of the first multimedia content and the first sticker.

Figure 5:
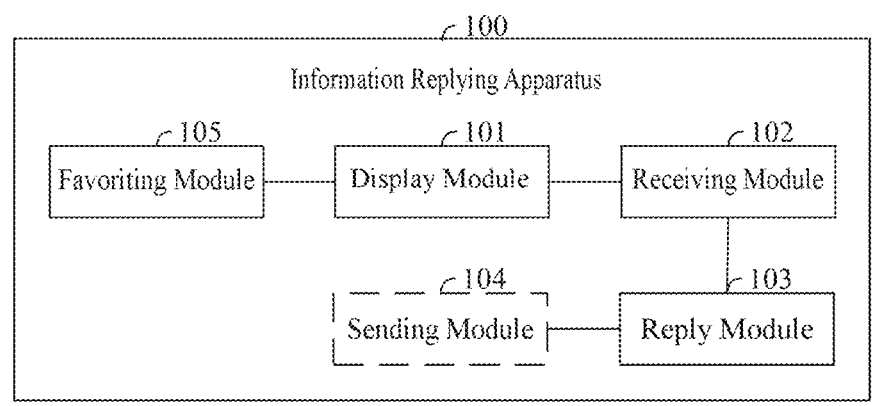
FIG. 5 is a schematic structural diagram of an information replying apparatus according to an embodiment of the present disclosure.

Reference is made to FIG. 5, which is a schematic structural diagram of an information replying apparatus according to an embodiment of the present disclosure. As shown in FIG. 5, the information replying apparatus 100 provided in the present disclosure may, on the basis of the apparatus structure shown in FIG. 3 or FIG. 4, further comprise: a favoriting module 105.

The display module 101 is further for displaying the target information in the comment area of the playing interface of the target multimedia content, wherein the comment area of the playing interface of the target multimedia content is an area where the comment on or reply to the target multimedia content is made; and the display module 101 is further for displaying a fifth control on the comment area of the playing interface of the target multimedia content after an instruction corresponding to a trigger operation performed on the target information being received;

the favorites module 105 is further for favoriting the target information after an instruction corresponding to a trigger operation performed on the fifth control being received.

In some embodiments, the display module 101 is further for displaying second multimedia content and displaying a second sticker containing the target information on a playing interface of the second multimedia content, wherein the second multimedia content is content in reply to the target information; and the favorites module 105 is further for favoriting the target information after an instruction corresponding to a trigger operation performed on the second sticker being received.

In some embodiments, the display module 101 is further for jumping to the playing interface of the target multimedia content after the instruction corresponding to the trigger operation performed on the second sticker being received, and display the target information and a second card in the comment area of the playing interface of the target multimedia content, wherein the second card comprises a thumbnail jointly formed by a playing picture of the second multimedia content and the second sticker.

The information replying apparatus provided in the present disclosure may perform the above method embodiments, and for specific implementation principles and technical effects, reference may be made to the above method embodiments, which are not repeated herein.

Figure 6:
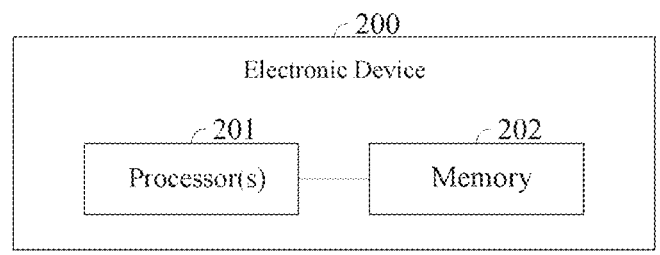
FIG. 6 is a schematic structural diagram of an electronic device according to an embodiment of the present disclosure.

Reference is made to FIG. 6, which is a schematic structural diagram of an electronic device according to an embodiment of the present disclosure. As shown in FIG. 6, the electronic device 200 provided by the present disclosure comprises: one or more processors 201; a memory 202; and one or more computer programs, wherein the one or more computer programs are stored in the memory 202; and the one or more processors 201, when executing the one or more computer programs, cause the electronic device 200 to implement the information replying method of the foregoing embodiments.

Exemplarily, the present disclosure provides a client, comprising: one or more processors; a memory; and one or more computer programs, wherein the one or more computer programs are stored in the memory; and the one or more processors, when executing the one or more computer programs, cause the client to implement the information replying method of the foregoing embodiments.

Exemplarily, the present disclosure provides a chip system, which is applied to an electronic device comprising a display, a memory, and a sensor, wherein the chip system comprises: a processor; and when the processor executes computer instructions stored in the memory, the electronic device performs the information replying method of the foregoing embodiments.

Exemplarily, the present disclosure provides a non-transitory computer-readable storage medium storing thereon a computer program which, when executed by an electronic device, causes the implementation of the information replying method of the foregoing embodiments.

Exemplarily, the present disclosure provides a computer program product storing thereon a computer program which, when being run on a computer, causes the computer to perform the information replying method of the foregoing embodiments.

In the above embodiments, all or part of the functions may be implemented by software, hardware, or a combination of software and hardware. When implemented by using software, they may be implemented all or partially in a form of a computer program product. The computer program product includes one or more computer instructions. The processes or functions according to the embodiments of the present disclosure are all or partially generated when the computer program instructions are loaded and executed on a computer. The computer may be a general-purpose computer, a special-purpose computer, a computer network, or another programmable apparatus. The computer instructions may be stored in a computer-readable storage medium. The computer-readable storage medium may be any available medium that may be accessed by the computer or a data storage device such as a server, data center, or the like, which is integrated with one or more available medium. The available medium may be a magnetic medium (e.g., a floppy disk, a hard disk, a magnetic tape), an optical medium (e.g., a DVD), or a semiconductor medium (e.g., a solid state disk (SSD)), etc.

It should be noted that, herein, relation terms such as "first" and "second" are merely used for distinguishing one entity or operation from another entity or operation without necessarily requiring or implying that there is any actual such relation or order between these entities or operations. Moreover, terms "comprising", "containing", or any other variations thereof, are intended to cover a non-exclusive inclusion, such that a process, method, article, or device comprising a series of elements includes not only those elements, but also other elements not expressly listed or elements inherent to such a process, method, article, or device. Without more restrictions, an element defined by a statement "comprising one . . . " does not exclude the presence of another identical element in the process, method, article, or device comprising the element.

The above description is only specific implementations of the present disclosure, so that those skilled in the art may understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments described herein but will conform to the widest scope consistent with the principles and novel features disclosed herein.

What is claimed is:

1. A method for replying to information, comprising the following steps performed by a processor:
displaying target information in a comment area of a playing interface of target multimedia content, the comment area of the playing interface of the target multimedia content being an area for commenting on or replying to the target multimedia content, the target information being obtained by commenting on or replying to target multimedia content;
receiving a favoriting instruction with respect to the target information, wherein the receiving a favoriting instruction with respect to the target information comprises:
after receiving an instruction corresponding to a trigger operation performed on the target information, displaying a fifth control on the comment area of the playing interface of the target multimedia content; and
receiving the favoriting instruction corresponding to the trigger operation performed on the fifth control;
favoriting the target information in response to the favoriting instruction;
after favoriting the target information, displaying the target information in a favorites page in response to a viewing instruction with respect to the target information;
receiving a reply instruction with respect to the target information, wherein the receiving a reply instruction with respect to the target information comprises:
receiving the reply instruction corresponding to a trigger operation performed on a second control displayed in the favorites page,
wherein the second control is used for replying to the target information with a video;
replying to the target information in response to the reply instructions;
playing second multimedia content and displaying a second sticker containing the target information on a playing interface of the second multimedia content, the second multimedia content being content with which the target information is replied to; and
after receiving an instruction corresponding to a trigger operation performed on the second sticker, jumping to the playing interface of the target multimedia content, and displaying the target information and a second card in a comment area of the playing interface of the target multimedia content,
wherein the second card comprises a thumbnail jointly formed by a playing picture of the second multimedia content and the second sticker.

2. The method according to claim 1, wherein the receiving a reply instruction with respect to the target information comprises:
receiving the reply instruction corresponding to a trigger operation performed on a first control displayed in the favorites page,
wherein the first control is used for replying to the target information in a text form and/or a multimedia form.

3. The method according to claim 1, wherein the receiving a reply instruction with respect to the target information comprises:
after receiving an instruction corresponding to a trigger operation having a duration greater than or equal to a preset duration performed on the target information, displaying a third control in the favorites page; and
receiving the reply instruction corresponding to a trigger operation performed on the third control.

4. The method according to claim 3, wherein the method further comprises:
after receiving the instruction corresponding to the trigger operation having the duration greater than or equal to the preset duration performed on the target information, displaying a fourth control in the favorites page; and receiving an instruction corresponding to a trigger operation performed on the fourth control, to perform any of operations of cancelling the favoriting, copy, and translation on the target information.

5. The method according to claim 4, wherein the method further comprises:
    after receiving an instruction corresponding to a trigger operation having a duration less than the preset duration performed on the target information, jumping to a playing interface of the target multimedia content, and displaying the target information in a comment area of the playing interface of the target multimedia content.

6. The method according to claim 1, wherein the replying to the target information in response to the reply instruction comprises:
    acquiring first multimedia content, the first multimedia content being content with which the target information is replied to,
    wherein a first sticker containing the target information is displayed on a playing interface of the first multimedia content.

7. The method according to claim 6, wherein the method further comprises:
    sending the first multimedia content to a server so that the server sends a notification message to a client associated with the target information,
    wherein the notification message is used for notifying the client associated with the target information that the target information has been replied to in a multimedia form.

8. The method according to claim 7, wherein the method further comprises:
    displaying the target information and a first card in a comment area of a playing interface of the target multimedia content,
    wherein the first card comprises a thumbnail jointly formed by a playing picture of the first multimedia content and the first sticker.

9. An electronic device, comprising:
    one or more processors;
    a memory; and
    one or more computer programs stored in the memory;
    wherein the one or more processors, when executing the one or more computer programs, cause the electronic device to implement the method for replying to information according to claim 1.

10. A non-transitory computer storage medium comprising computer instructions which, when being run on an electronic device, cause the electronic device to perform the method for replying to information according to claim 1.

* * * * *